United States Patent
Kume et al.

(10) Patent No.: US 12,539,877 B2
(45) Date of Patent: Feb. 3, 2026

(54) AUTOMATED OPERATION DEVICE, NOTIFICATION CONTROL DEVICE, AND NOTIFICATION CONTROL METHOD

(71) Applicant: DENSO CORPORATION, Kariya (JP)

(72) Inventors: Takuya Kume, Kariya (JP); Kazuki Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 126 days.

(21) Appl. No.: 18/631,690

(22) Filed: Apr. 10, 2024

(65) Prior Publication Data
US 2024/0253658 A1   Aug. 1, 2024

Related U.S. Application Data

(63) Continuation of application No. PCT/JP2022/037453, filed on Oct. 6, 2022.

(30) Foreign Application Priority Data

Oct. 13, 2021 (JP) .................. 2021-168161
Jan. 25, 2022 (JP) .................. 2022-009649

(51) Int. Cl.
*B60W 50/14* (2020.01)
*B60W 40/08* (2012.01)
*B60W 50/00* (2006.01)

(52) U.S. Cl.
CPC ............ *B60W 50/14* (2013.01); *B60W 40/08* (2013.01); *B60W 2040/0818* (2013.01);
(Continued)

(58) Field of Classification Search
CPC ................ B60W 50/14; B60W 40/08; B60W 2540/215; B60W 2540/229;
(Continued)

(56) References Cited

U.S. PATENT DOCUMENTS

2006/0244615 A1* 11/2006 Koors ................. G01W 1/02
340/601
2016/0052391 A1* 2/2016 Walsh .................. G08B 21/06
340/575
(Continued)

FOREIGN PATENT DOCUMENTS

CN        105741586 A  *  7/2016  ......... G08G 1/09623
CN        205788789 U  *  12/2016
(Continued)

*Primary Examiner* — Chico A Foxx
(74) *Attorney, Agent, or Firm* — Harness, Dickey & Pierce, P.L.C.

(57) ABSTRACT

An automated operation device is configured to perform automated driving at an automation level that allows a driver-seat occupant, who is an occupant seated on a driver seat to sleep. A congestion information acquisition unit is configured to acquire information on congestion on a travel route of a subject vehicle. A congestion notification processing unit is configured to execute processing to cause a notification device to notify the driver-seat occupant of the information on the congestion. An occupant state acquisition unit is configured to acquire whether the driver-seat occupant is asleep based on an input signal from an occupant state sensor that is configured to sense a state of the driver-seat occupant. The congestion notification processing unit is configured to change a notification mode of the congestion based on whether the driver-seat occupant is asleep, while the automated driving is performed.

20 Claims, 11 Drawing Sheets

(52) U.S. Cl.
CPC .............. *B60W 2050/0083* (2013.01); *B60W 2050/146* (2013.01); *B60W 2510/244* (2013.01); *B60W 2540/215* (2020.02); *B60W 2540/221* (2020.02); *B60W 2540/229* (2020.02); *B60W 2554/406* (2020.02)

(58) Field of Classification Search
CPC ..... B60W 2540/221; B60W 2554/406; B60W 2040/0818; B60W 2050/0083; B60W 2050/146; B60W 2510/244
See application file for complete search history.

(56) References Cited

U.S. PATENT DOCUMENTS

| | | | |
|---|---|---|---|
| 2017/0028987 A1* | 2/2017 | Yamada | B60N 2/0022 |
| 2018/0127001 A1* | 5/2018 | Ricci | B60W 30/14 |
| 2019/0039618 A1 | 2/2019 | Mori | |
| 2019/0065873 A1* | 2/2019 | Wang | G06V 40/168 |
| 2024/0034362 A1* | 2/2024 | Oba | B60W 60/0051 |
| 2024/0246568 A1* | 7/2024 | Kume | G08G 1/16 |

FOREIGN PATENT DOCUMENTS

| | | | | |
|---|---|---|---|---|
| CN | 114648549 A | * | 6/2022 | ......... G06F 18/2431 |
| CN | 112561282 B | * | 10/2022 | ............ G06Q 50/26 |
| JP | 2005324661 A | | 11/2005 | |
| JP | 2017107502 A | | 6/2017 | |
| JP | 2017178131 A | | 10/2017 | |
| JP | 2021006802 A | | 1/2021 | |
| WO | WO-2017154396 A1 | | 9/2017 | |

* cited by examiner

FIG. 5

| SLEEP DEPTH | Lt<Th | Lt≥Th |
|---|---|---|
| 0 (AWAKE) | CANCEL NOTIFICATION | REROUTE SUGGESTION |
| 1 (LIGHT SLEEP) | DISPLAY ONLY | DISPLAY + NOTIFICATION SOUND |
| 2 (DEEP SLEEP) | HOLD NOTIFICATION | DISPLAY + VOICE MESSAGE |

AUTOMATED OPERATION DEVICE, NOTIFICATION CONTROL DEVICE, AND NOTIFICATION CONTROL METHOD

CROSS REFERENCE TO RELATED APPLICATION

The present application is a continuation application of International Patent Application No. PCT/JP2022/037453 filed on Oct. 6, 2022, which designated the U.S. and claims the benefit of priority from Japanese Patent Applications No. 2021-168161 filed on Oct. 13, 2021 and No. 2022-009649 filed on Jan. 25, 2022. The entire disclosures of all of the above applications are incorporated herein by reference.

TECHNICAL FIELD

This disclosure relates to an automated operation device configured to perform automated driving that allows a driver to sleep.

BACKGROUND

Vehicles that travel autonomously by on-board systems have been known.

SUMMARY

According to an aspect of the present disclosure, an automated operation device is configured to perform automated driving at an automation level that allows a driver-seat occupant, who is an occupant seated on a driver seat to sleep.

BRIEF DESCRIPTION OF THE DRAWINGS

The above and other objects, features and advantages of the present disclosure will become more apparent from the following detailed description made with reference to the accompanying drawings. In the drawings:

FIG. 5 is a diagram showing an example of setting of notification modes according to sleep depth and congestion length;

FIG. 10 is a diagram showing a control flow chart for a notification of remaining battery capacity and the like.

DETAILED DESCRIPTION

Figure 1:
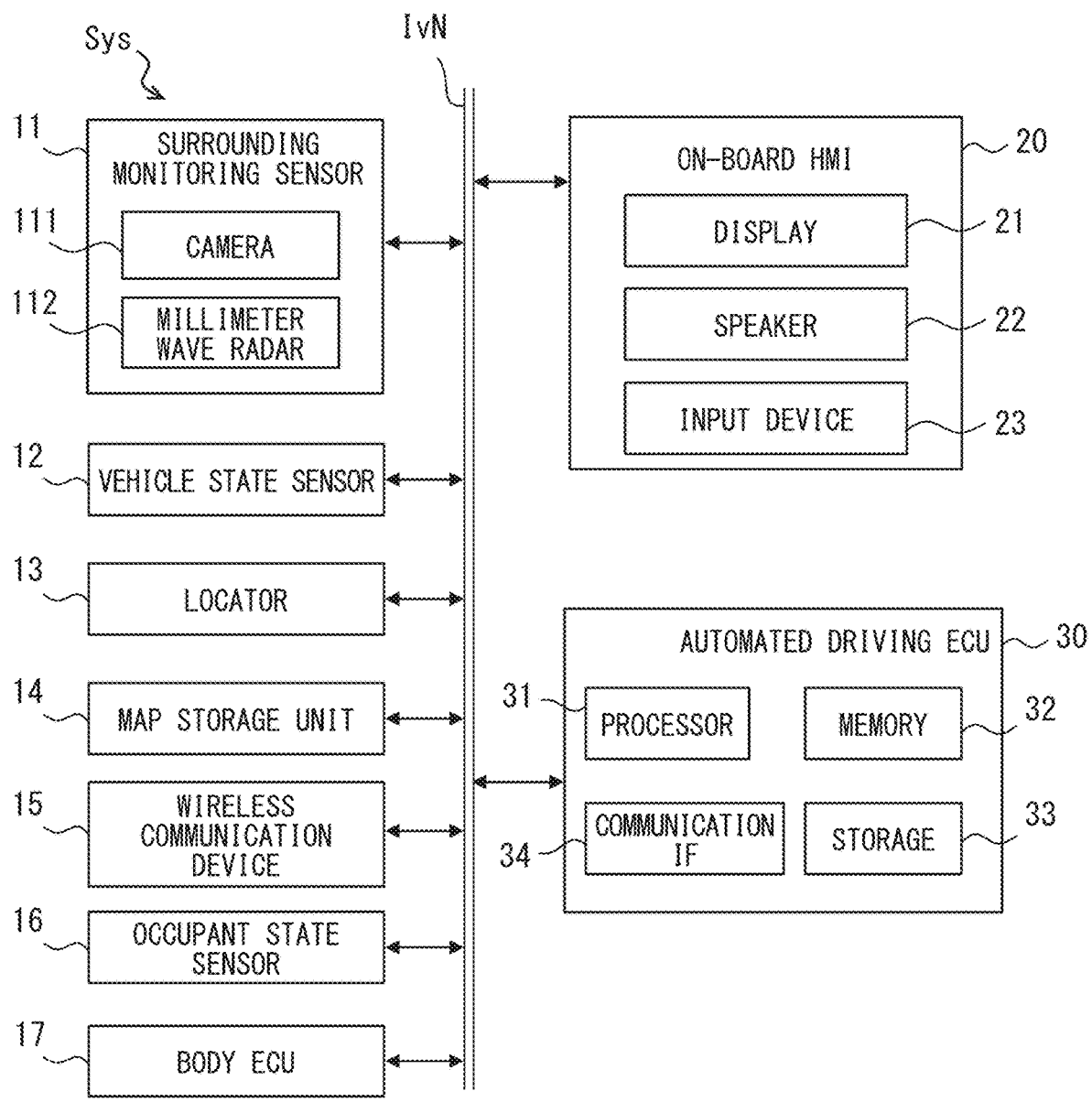
FIG. 1 is a block diagram showing a configuration of an automated driving system.

Hereinafter, examples of the present disclosure will be described.

According to an example of the present disclosure, a control device continues an autonomous travel control of a vehicle by an on-board system (so-called automated driving) even while a driver seat occupant is asleep.

The automation levels of driving operation are known, for example, as Levels 0 to 5 as defined by the Society of Automotive Engineers of America (SAE International, SAE is a registered trademark). Level 0 is a level at which the driver seat occupant (the so-called driver) performs all the driving tasks without any system intervention. Level 0 corresponds to the so-called manual automated driving. Level 1 is a level at which the system assists either a steering or an acceleration and deceleration. Level 2 is a level at which the system assists both the steering and the acceleration and deceleration. In the automation levels 1 to 2, the driver seat occupant has a surrounding monitoring obligation for safe driving. Level 3 is a level at which the system is capable of performing all the driving tasks in certain locations, such as expressways, and at which the driver seat occupant performs driving operation in an emergency. Level 4 is a level at which the system is capable of performing all the driving tasks, except under specific circumstances such as roads that cannot be handled, extreme environments, and the like. Level 5 is a level at which the system performs all the driving tasks in all the environments.

The automation level 3 or higher correspond to so-called the automated driving. Level 3 prohibits, for example, a sleep state that prohibits the driver seat occupant from returning to the driving operation immediately. Level 4 and Level 5 correspond to the automation levels where the driver seat occupant is allowed to sleep. In this disclosure, the automated driving equivalent to Level 3 is referred to as Level 3 automated driving, and Level 4 or higher automated driving is also referred to as Level 4 automated driving.

Level 3 automated driving requires the driver seat occupant to stay awake. This makes it easier for the driver seat occupant to recognize whether or not it is caught in congestion. Accordingly, it is possible to recognize whether or not it is likely to be a delay in an estimated arrival time. On the other hand, Level 4 automated driving allows the driver seat occupant to sleep. In Level 4 automated driving, the vehicle continues to travel autonomously according to a route to its destination even while the driver seat occupant is asleep. When a congestion occurs while Level 4 automated driving is being executed and the driver seat occupant is asleep, it is difficult for the driver seat occupant to recognize the occurrence of the congestion. When the congestion occurs while Level 4 automated driving is being executed and the driver seat occupant is asleep, the driver seat occupant will notice that the driving schedule has been delayed only when he or she naturally awakes from sleep. As a result, convenience for the automated driving functions would be impaired.

When the congestion is detected while executing Level 4 automated driving, a conceivable configuration does not to notify the sleeping driver seat occupant of this fact. With this configuration, it is difficult for the sleeping driver seat occupant to recognize that he or she is caught in congestion. Another conceivable assumed configuration to address the above concern is to notify the driver seat occupant every time an occurrence of congestion is detected. However, notifying the driver seat occupant every time a congestion occurs possibly causes annoyance to the driver seat occupant.

According to an example of the present disclosure, an automated operation device is configured to perform automated driving at an automation level that allows a driver-seat occupant, who is an occupant seated on a driver seat to sleep. The automated operation device comprises:
- a congestion information acquisition unit configured to acquire information on congestion on a travel route of a subject vehicle;
- a congestion notification processing unit configured to execute processing to cause a notification device to notify the driver-seat occupant of the information on the congestion; and
- an occupant state acquisition unit configured to acquire whether the driver-seat occupant is asleep based on an input signal from an occupant state sensor that is configured to sense a state of the driver-seat occupant. The congestion notification processing unit is configured to change a notification mode of the congestion based on whether the driver-seat occupant is asleep, while the automated driving is performed.

According to the above configuration, during the automated driving, the notification mode of the congestion is changed depending on whether the driver seat occupant is awake or not. According to this configuration, the notification mode of the congestion can be selected according to the state of the driver seat occupant, thereby reducing possibility of causing annoyance to the driver seat occupant compared with a configuration that uniformly performs the notification or does not perform the notification. According to the above-described configuration, even when the driver seat occupant is asleep, the notification of the congestion can be performed in the predetermined mode. Even when the content of the notification itself is not recognized by the driver seat occupant, the stimuli (light, sound, and vibration) by the notification awakes the driver seat occupant, and as a result, the driver seat occupant becomes more aware that he or she is caught in the congestion. In other words, it reduces the possibility that when the driver seat occupant wakes up, the original arrival time will have passed, or that a delay of a certain amount of time or more is inevitable. Thus, the above-described configuration can reduce the possibility of occupant convenience or comfortability being impaired by the congestion.

According to an example of the present disclosure, an automated operation device is configured to perform automated driving at an automation level that allows a driver-seat occupant to sleep. The automated operation device comprises:
- a congestion information acquisition unit configured to acquire information on congestion on a travel route of a subject vehicle; and
- a congestion notification processing unit configured to execute processing to cause a notification device to notify the driver-seat occupant of the information on the congestion. The congestion information acquisition unit is configured to acquire a delay amount in arrival, which is an amount of delay in estimated arrival time due to the congestion, or a congestion length indicating a length of congestion. The congestion notification processing unit is configured to change a notification mode of the congestion, according to the delay amount in arrival or the congestion length, while the automated driving is performed.

According to the above configuration, during the automated driving, the notification mode of the congestion is changed based on the congestion length or the delay amount in arrival. According to this configuration, the notification mode of the congestion can be selected according to the degree of influence of the congestion, thereby reducing the possibility of causing annoyance to the driver seat occupants compared with a configuration that uniformly performs the notification or does not perform the notification. According to the above-described configuration, when the driver seat occupant is asleep, the notification of the congestion can be performed in the predetermined mode. When the driver seat occupant is awakened by the stimuli (light, sound, vibration) from the notification, the occupant may recognize that he or she is caught in the congestion based on a surrounding condition in his or her field of vision. As a result, the possibility that the original arrival time will have passed or a delay of a certain amount of time or more is inevitable when the driver seat occupant wakes up can be reduced. In other words, the above-described configuration can also reduce the possibility of convenience or comfortability of the occupant being impaired by the congestion.

According to an example of the present disclosure, a notification control device is to be used in connection with an automated operation device, the automated operation device configured to perform automated driving at an automation level that allows a driver-seat occupant, who is an occupant seated on a driver seat to sleep. The notification control device comprises:
- a congestion information acquisition unit configured to acquire information on congestion on a travel route of a subject vehicle;
- a congestion notification processing unit configured to execute processing to cause a notification device to notify the driver-seat occupant of the information on the congestion;
- an occupant state acquisition unit configured to acquire a sleep state of the driver-seat occupant based on an input signal from an occupant state sensor that is configured to sense a state of the driver-seat occupant; and
- an driving mode acquisition unit configured to acquire a signal indicating whether the automated driving is performed from the automated operation device. The congestion notification processing unit is configured to change a notification mode of the congestion, based on whether the driver-seat occupant is asleep while the automated driving is performed.

According to an example of the present disclosure, a notification control method is to be performed by at least one processor for a vehicle. The notification control method comprises:
- acquiring information on congestion on a travel route of the vehicle based on data received from an external device or a result detected by a peripheral monitoring sensor mounted on the vehicle;
- executing processing to cause a notification device to notify a driver-seat occupant, who is an occupant seated on a driver seat, of the information on the congestion;
- acquiring occupant state information including whether the driver-seat occupant is asleep, based on an input signal from an occupant state sensor that is configured to sense a state of the driver-seat occupant;
- acquiring a signal indicating whether the automated driving is performed from an automated operation device, the automated operation device configured to perform the automated driving at an automation level that allows the driver-seat occupant to sleep; and changing a notification mode of the congestion based on whether the driver-seat occupant is asleep while the automated driving is performed.

According to the above-described notification control device/notification control method, the same action as the action of the first automated operation device makes it possible to reduce the possibility of convenience or comfortability of the occupant being impaired by congestion.

With reference to the drawings, an example of an embodiment of the present disclosure will be described. The present disclosure can be performed with a modification as appropriate to compliant with a local law and a custom where the following automated driving system Sys is applied.

INTRODUCTION

FIG. 1 shows an example of a schematic configuration of an automated driving system Sys according to the present disclosure. The automated driving system Sys can be mounted on a vehicle that can travel on a road. The vehicle to which the automated driving system Sys is applied may be a four-wheeled vehicle, as well as a two-wheeled vehicle, three-wheeled vehicle, and the like. The vehicle to which the automated driving system Sys is applied may be an owner car owned by an individual, a shared car, or a rented car. The shared car is a vehicle used for a car sharing service, and a rented car is a vehicle used for a vehicle rental service. In the following, the vehicle on which the automated driving system Sys is mounted is also referred to as a subject vehicle.

Here, as an example, the subject vehicle is an electrification vehicle, but it is not limited thereto. The subject vehicle may be an engine vehicle. The concept of electrification vehicle can include not only electric vehicles, but also plug-in hybrids vehicles, hybrids vehicles, and fuel cell vehicles. The engine vehicle is a vehicle equipped only with an engine as a drive source, and corresponds to a vehicle that travels on fuel such as gasoline or diesel oil. The electric vehicle refers to a vehicle equipped only with a motor as a drive source. The hybrid vehicle refers to a vehicle with an engine and a motor as power sources.

The driver in this disclosure is not limited to a person who is actually performing a driving operation, but can also refer to a person who should receive the driving operation authority from the automated driving system Sys at the end of automated driving. In other words, the driver in this disclosure refers to the person who is sitting in a driver seat, that is, the driver seat occupant, regardless of whether he/she is actually driving or not. The description of the driver in this disclosure may be replaced with the driver seat occupant. The subject vehicle may be a remotely operated vehicle that is remotely operated by an operator located outside the vehicle. The person who takes over the driving operation from the automated driving system Sys may be an operator located outside the vehicle. The operator here refers to a person authorized to control the vehicle remotely from outside the vehicle. The operator can also be included in the concept of the driver seat occupant. The operator may be the target of various information notifications by the system.

The automated driving system Sys provides a so-called automated driving function that allows the subject vehicle to travel autonomously along a predetermined travel route. There can be a plurality of levels of the automated driving operation (hereinafter referred to as automation level), as defined, for example, by the Society of Automotive Engineers of America (SAE International). The automation levels are classified into six levels, for example, Levels 0 to 5 below.

Level 0 is the level at which the driver performs all the driving tasks without any system intervention. The driving tasks include, for example, the steering and the acceleration and deceleration. The driving task also includes monitoring a surrounding of the vehicle, for example, in front of the vehicle. Level 0 corresponds to the so-called fully manual driving level. Level 1 is the level at which the system assists either the steering or the acceleration and deceleration. Level 2 refers to the level at which the system assists some of the steering operation and the acceleration and deceleration operations. Levels 1 to 2 correspond to the so-called driving assistance level.

Level 3 refers to the level where the system executes all the driving operation tasks within an Operational Design Domain (ODD), while the authority to operate is transferred from the system to the driver in an emergency. The ODD specifies the conditions under which the automated driving can be executed, such as, for example, that the traveling position must be on a limited highway. Level 3 corresponds to the so-called conditional automated driving.

Level 4 is the level at which the system performs all the driving tasks, except under specific circumstances, such as roads that cannot be handled, extreme environments, and the like. Level 4 corresponds to the level at which the system performs all the driving tasks in the ODD. Level 4 corresponds to the so-called highly automated driving. Level 5 is the level at which the system is capable of performing all the driving tasks in any environment. Level 5 corresponds to the so-called fully automated driving.

The automation levels 3 to 5 correspond to the automated driving. In this disclosure, the automated driving corresponding to the automation level 4 is referred to as level 4 automated driving. The automated driving that corresponds to the automation Level 3 is referred to as Level 3 automated driving. In Level 3 automated driving, the driver must immediately resume the driving operation in the event of an emergency, and sleeping, for example, is prohibited. In Level 4 automated driving, on the other hand, the driver may be allowed to sleep. The automated driving system Sys of this disclosure is configured to perform Level 4 automated driving. Certainly, the automated driving system Sys of this disclosure may be configured to perform the automated driving equivalent to the automation level 5.

The driver seat of a vehicle described below is configured, as an example, as a reclining seat in which a backrest can be folded down to an angle suitable for sleeping or resting an occupant, for example. As an example in this disclosure, the angle of the backrest is represented with respect to a floor of the vehicle. The angle suitable for the occupant to sleep or rest is, for example, 30 or 45 degrees. Certainly, the driver seat may be configured such that the backrest can tilt to 0 degrees. The angle that the backrest of the driver seat makes with a floor/seating surface of the vehicle is also described as the backrest angle. The smaller the backrest angle is, the more the backrest falls toward the rear of the vehicle. In this disclosure, a state in which the backrest angle is less than 45 degrees or less is also referred to as the resting posture. In other cases, the backrest angle may be represented with respect to the vehicle height direction. The angle of the backrest represented as 0° in the height direction can also be referred to as the reclining angle.

<About Overall Structure of Automated Driving System Sys>

The automated driving system Sys has various configurations shown in FIG. 1 as an example. In other words, the automated driving system Sys includes a surrounding monitoring sensor 11, vehicle state sensors 12, a locator 13, a map storage unit 14, a wireless communication device 15, an occupant state sensor 16, a body ECU 17, and a traveling actuator 18. The automated driving system Sys also includes an on-board HMI 20 and an automated driving ECU 30. The ECU stands for Electronic Control Unit and means an electronic control device. HMI stands for Human Machine Interface.

The automated driving ECU 30 is connected to each of the above devices/sensors, such as the surrounding monitoring sensor 11, via an in-vehicle network IvN or by dedicated signal lines, for mutual communication. The in-vehicle network IvN is a communication network built in the vehicle. A variety of standards can be employed for the in-vehicle network IvN, such as Controller Area Network (hereinafter referred to as CAN: registered trademark), Ethernet (registered trademark), and the like. The configuration of connection between the devices can be changed as needed. Some devices/sensors may be directly connected to the automated driving ECU 30 by the dedicated signal lines.

The surrounding monitoring sensor 11 is an autonomous sensor that monitors the surrounding environment of the subject vehicle. The surrounding monitoring sensor 11 is capable of detecting predefined moving and stationary objects in a detection range around the subject vehicle. The automated driving system Sys may include several types of the surrounding monitoring sensors 11. The automated driving system Sys includes, for example, a camera 111 and a millimeter wave radar 112 as the surrounding monitoring sensors 11.

The camera 111 is, for example, so-called forward camera arranged to capture images of the front of the vehicle in a predetermined angle of view. The camera 111 is arranged at the top of the interior side of a windshield, a front grille, and a roof top. In addition to a camera body that generates image frames, the camera 111 may include a camera ECU that detects a predetermined detection target object based on the image frames. The camera body is constituted of at least an image sensor and a lens. The camera ECU is mainly constituted of a central processing unit (CPU) and a graphics processing unit (GPU). The camera ECU detects and identifies objects registered as targets for detection using a discriminator that applies deep learning, for example. The deep learning method may be a convolutional neural network (CNN) or a deep neural network (DNN).

The camera 111 detects a moving object such as a pedestrian and another vehicle, for example. The camera 111 can also detect a geographic object such as a road edge, a road surface marking, and a structure installed along the road. The road surface marking includes a lane demarcation line indicating a boundary of a lane, a crosswalk, a stop line, a conduit zone, a safety zone, and a regulatory arrow. The structures installed along a road include a road sign, a guardrail, a curb, a utility pole, and a traffic signal. The camera 111 can also detect a lighting state of other lighting devices such as hazard lamps and direction indicators of a vehicle in front.

The automated driving system Sys may include a plurality of cameras 111. For example, the automated driving system Sys may include a side camera that captures images of side of the vehicle and a rear camera that captures images of rear of the vehicle as well as the front camera 111. The function of detecting an object to be detected by analyzing camera images may be provided by another ECUs, such as the automated driving ECU 30, for example. The arrangement of functions within the automated driving system Sys may be changed as needed. The camera 111 outputs at least one of image data taken around the own vehicle and a result of analysis of the image data to the in-vehicle network IvN. The data flowing in the in-vehicle network IvN is referenced by the automated driving ECU 30 as appropriate.

The millimeter wave radar 112 is a device that detects a relative position and a relative speed of an object relative to the subject vehicle by transmitting and receiving a probing wave, such as a millimeter wave or a quasi-millimeter wave, in a predetermined direction. The automated driving system Sys may include a plurality of millimeter wave radars 112, each arranged to have a different detection area. The automated driving system Sys includes a forward millimeter wave radar and a rear millimeter wave radar as the millimeter wave radars 112. The forward millimeter wave radar is the millimeter wave radar 112 that transmits the probing wave toward the front of the vehicle and is disposed in, for example, the front grille or in the front bumper. The rear millimeter wave radar is the millimeter wave radar 112 that transmits the probing wave toward the rear of the vehicle and is disposed, for example, in the rear bumper. Each millimeter wave radar 112 generates data indicating the relative position and the relative speed of a detected object and outputs the data to the automated driving ECU 30, and the like as a detection result. The detection target objects of the millimeter wave radar 112 may include a manhole (a steel plate), and a three-dimensional structure as a landmark, in addition to another vehicle, a pedestrian.

The automated driving system Sys may include a LiDAR, a sonar, and other sensors as surrounding monitoring sensors 11 in addition to the camera 111 and the millimeter wave radars 112. LiDAR stands for Light Detection and Ranging or Laser Imaging Detection and Ranging. The LiDAR is a device that generates 3D point cloud data showing locations of reflected points in each detection direction by emitting a laser beam. The LiDAR is also referred to as a laser radar. The sonar is a device that detects the relative position and the relative speed of a reflected object by transmitting and receiving an ultrasonic wave as the probing wave. As for the LiDAR and the sonar, the automated driving system Sys may include pluralities of the units. The camera 111 and the millimeter wave radars 112 are examples of the surrounding monitoring sensors 11 and are not essential elements. The detection results of each surrounding monitoring sensor 11 are input to the automated driving ECU 30.

The vehicle state sensors 12 are a group of sensors that detect information about state of the subject vehicle. The vehicle state sensors 12 include a speed sensor, a steering angle sensor, an acceleration sensor, a yaw rate sensor, and the like. The vehicle speed sensor detects a vehicle speed of the own vehicle. The steering angle sensor detects a steering angle. The acceleration sensors detect accelerations such as a forward/backward acceleration and a lateral acceleration of the own vehicle. The yaw rate sensor detects an angular velocity of the own vehicle. The vehicle state sensors 12 output data indicating current values (that is, the detection result) of the physical state quantities to be detected to the in-vehicle network IvN.

The types of sensors used by the automated driving system Sys as the vehicle state sensors 12 can be designed accordingly and does not need to have all the sensors mentioned above. The automated driving system Sys may also include a backrest angle sensor or another sensor as the vehicle state sensors 12. The backrest angle sensor detects the backrest angle of the driver seat. The automated driving ECU 30 may receive a signal indicating the backrest angle of the driver seat from the backrest angle sensor or from a seat motor in the driver seat.

The locator 13 is a device that calculates and outputs position coordinate of the subject vehicle using a navigation signal transmitted from positioning satellites that constitute the Global Navigation Satellite System (GNSS). The locator 13 includes a GNSS receiver, an inertial sensor, and the like. The locator 13 combines a positioning signal received by the GNSS receiver, a measurement result from the inertial sensor, and vehicle speed information and the like flowing in the in-vehicle network IvN to sequentially calculate the own vehicle position of the subject vehicle, a direction of travel, and the like, and the locator 13 outputs them as locator information to the automated driving ECU 30.

The map storage unit 14 is a storage device in which so-called High Definition (HD) map data, including road information necessary for the automated driving control devices, is stored. The map data stored in the map storage unit 14 include a three-dimensional shape of a road, a location of a road surface marking such as a lane demarcation line, and a location of a traffic sign with accuracy required for the automated driving and other applications.

The map data stored in the map storage unit 14 can be updated, for example, by data received by the wireless communication device 15 from a map server or another source. The map server is a server located outside the vehicle that distributes the map data. The map storage unit 14 may be the storage device for temporarily holding the map data received by the wireless communication device 15 from the map server until the data expires. The map storage unit 14 may be built into the automated driving ECU 30 or the locator 13. The map data held by the map storage unit 14 may be navigation map data as the map data for navigation, provided that it includes geographic object data such as confluence points, traffic signals, landmarks, and the like.

The wireless communication device 15 is a device that allows the subject vehicle to perform wireless communication with other devices. The wireless communication device 15 is configured to be able to perform cellular communication. The cellular communication is a wireless communication that conforms to a prescribed wide-area wireless communication standard. A variety of wide-area wireless communication standards can be employed here, such as Long Term Evolution (LTE), 4G, and 5G.

The subject vehicle becomes a connected car that can be connected to the Internet by mounting the wireless communication device 15. For example, the automated driving ECU 30, in cooperation with the wireless communication device 15, can download the map data according to its current location from a map distribution server. The wireless communication device 15 may be configured to enable direct wireless communication with other devices without the need for a wireless base station, using a method compliant with wide-area wireless communication standards. In other words, the wireless communication device 15 may be configured to perform the cellular V2X (PC5/Uu).

The wireless communication device 15 is configured to be able to perform a narrow-range communication. The narrow-range communication in this disclosure refers to a wireless communication where the communication range is limited to within a few hundred meters. Dedicated Short Range Communication (DSRC), which corresponds to the IEEE 802.11p standard, and Wi-Fi (registered trademark), for example, can be employed as the narrow-range communication standard. The narrow-range communication method may be the above-described cellular V2X as described above. The wireless communication device 15 may be configured to be able to perform only either the cellular communication or the narrow-range communication. The wireless communication device 15 may be configured to be able to perform a communication compliant with the standard such as Bluetooth Low Energy (BLE, Bluetooth is a registered trademark).

The wireless communication device 15 can receive the dynamic map data regarding a travel route of the subject vehicle from an external device, such as the map server, a traffic information center, a roadside unit, and another vehicle. The roadside unit is a wireless communication device installed along the road. The dynamic map data is data about elements whose durational states or locations can change, for example, from 10 minutes to an hourly basis. Location information such as a congestion section, a restricted section, a construction section, and the like, a road surface condition at each location, a weather condition, a falling object, a cruising speed, and the like fall under the category of dynamic map elements. The data for the dynamic map elements may be received from the map server together with static map data in a form of a streaming distribution.

Thus, the wireless communication device 15 acquires congestion information from the external device. The congestion information includes at least one of a location of a congestion section and a congestion length indicating a length thereof. For example, the congestion length is represented in terms of a distance concept, for example, 1 km. The congestion length may be represented in terms of a required transit time, which is a time required to enter and exit the congestion section. The congestion length may be represented indirectly by the starting and ending positions of the congestion section. The congestion information may include a cause of the congestion and an average speed during the congestion. The congestion information acquired by the wireless communication device 15 is forwarded to the automated driving ECU 30.

The congestion in the present disclosure means, for example, a state in which a traveling speed is equal to or less than a predetermined congestion determination value, or a state in which a line of vehicles repeatedly stopping and starting continues for 1 km or more and for 15 minutes or more. The congestion determination value is, for example, 40 km/h. Certainly, the congestion determination value may be 20 km/h or 60 km/h. The congestion determination value may be dynamically determined according to the speed limit set for each road. The congestion determination value may be set at a quarter of the speed limit, for example. The different congestion determination values may be applied depending on whether the road is a limited highway or a public road. The congestion determination value for the limited highway may be 20 km/h, while the congestion determination value for the public road may be 10 km/h. The limited highway here refers to a road where a pedestrian and a bicycle are prohibited from entering, such as the expressway and another toll road.

The wireless communication device 15 may acquire information from the vehicle in front thereof via an inter-vehicle communication, such as state of the hazard lamps, a vehicle speed, and a degree to which the brake pedal is depressed. It may also use the inter-vehicle communication with the vehicle in front to acquire whether or not a congestion condition is detected in the vehicle in front. The vehicle in front here refers to the vehicle traveling in front of the subject vehicle. The vehicle in front is not limited to the vehicle primarily traveling in the same lane as the subject vehicle, but can also include a vehicle traveling in an adjacent lane. The concept of the vehicle in front can include a vehicle traveling diagonally forward. The vehicle in front of the subject vehicle that is traveling in the same lane as the subject vehicle and is closest to the subject vehicle is also referred to as a preceding vehicle.

The occupant state sensor 16 is a sensor that detects a state of the driver. The automated driving system Sys may include several types of occupant state sensors 16. For example, the automated driving system Sys includes, for example, a driver status monitor (hereafter referred to as DSM). The DSM is a sensor that sequentially detects the state of the driver based on a facial image of the driver. Specifically, the DSM uses a near-infrared camera to capture a face of the driver and applies an image recognition processing to the captured image to sequentially detect a face direction, a gaze direction, eyelid opening degrees, and the like of the driver. An infrared camera of the DSM is positioned such that it can capture the face of the driver on a top of a steering column cover, a top of an instrument panel, or a top end of the windshield, with the optical axis facing a headrest of the driver seat, for example.

The DSM as the occupant state sensor 16 sequentially outputs information indicating the face direction, the gaze direction, the eyelid opening degrees of the driver, and the like identified from the captured image to the in-vehicle state network IvN as driver state data. The driver state data corresponds to occupant state information. The camera that constitutes the DSM may be a visible light camera. The camera constituting the DSM may be provided in an overhead console or in the center of a ceiling to allow imaging of the face of the driver sleeping on his/her back. There may be more than one camera constituting the DSM. In addition to the DSM, the automated driving system Sys may include a camera that detects presence or absence and state of the occupant in the driver seat or rear seats (that is, passenger). The function for detecting the state of the driver and the like based on an image signal of the camera may be provided, for example, by the automated driving ECU 30. A camera that detects the presence or absence of a passenger seat, and the like and its state is referred to as a passenger sensor. The passenger sensor corresponds to a type of the occupant state sensor 16. The data indicating the presence or absence of the passenger and the state of the passenger also correspond to the occupant state information.

The automated driving system Sys may include a biometric sensor other than the DSM instead of or parallel to the DSM as the occupant state sensor 16. For example, the automated driving system Sys may include a heart rate sensor, a pulse wave sensor, a body temperature sensor, and the like as the occupant state sensors 16. The heart rate sensor and the like may be built into the backrest or the headrest of the driver seat, or it may be located on the steering wheel. A millimeter wave radar, which detects the heart rate, a body motion, and a posture of the driver by transmitting and receiving the millimeter wave as the probing wave toward the driver seat, can also be included in the biometric sensor.

The occupant state sensor 16 may be a wearable device that is worn to be used on a wrist of the driver, for example. The wearable devices can take a variety of shapes, including a wristband, a wristwatch, a ring, and an earphone type. The wearable device as the occupant state sensor 16 is configured for mutual communication with the automated driving ECU 30 via, for example, the wireless communication device 15. The connection configuration between the wearable device and the automated driving ECU 30 may be a wireless connection using BLE or the like, or it may be a wired connection.

The body ECU 17 is an ECU that integrally controls on-board devices of a body system mounted in the vehicle. The body system on-board devices include headlights and other lighting devices, seat motors, and the like. The seat motors is a motor that changes a forward/backward position, a height, and the backrest angle of the seat as the driver seat. The body ECU 17 may output a signal indicating the current backrest angle and other information to the automated driving ECU 30 based on the input signal from the seat motor.

The on-board HMI 20 is a group of interfaces for exchanging information between the occupant and the automated driving system Sys. The on-board HMI 20 includes a display 21 and a speaker 22 as the notification devices, which are devices for notifying information to the driver. The on-board HMI 20 also includes an input device 23 as an input interface that accepts operations from the occupants.

The automated driving system Sys includes one or plurality of a head-up display (HUD), a meter display, and a center display as display 21. The HUD is a device that projects an imaginary image that can be perceived by the driver by projecting image light onto a predetermined area of the windshield. The meter display is a display located in the area in front of the driver seat in the instrument panel. The center display is a display located in the center of the instrument panel in the width direction of the vehicle. The meter display and the center display can be realized using an LCD display or an OLED display. The display 21 displays images according to the input signal based on control signal and video signal input from the automated driving ECU 30.

The speaker 22 is a device that outputs sound corresponding to the signal input from the automated driving ECU 30. A representation of sound includes the notification sounds as well as voice and music. The automated driving system Sys may include a vibrator or an ambient light as the notification device. The vibrator is a device used to apply a vibrational stimulation to the driver, and is installed in the backrest of the driver seat or on the seatbelt. The vibrator may be a device that applies a vibration stimulation to the driver by vibrating the seatbelt itself. The ambient light is a lighting device realized by plurality of light emitting diodes (LEDs) that can be adjusted for emission color and intensity, and is provided in the instrument panel, and the steering wheels, or the like.

The input device 23 is a device for accepting instruction operation of the driver for the automated driving system Sys. As the input device 23, steering wheel switches on spokes of the steering wheel, control levers on the steering column, and touch panels stacked on the center display can be employed. The automated driving system Sys may include several types of devices described above as the input device 23. The input device 23 outputs electrical signal corresponding to the operation of the driver to the in-vehicle network IvN as operation signal. The operation signal contains information indicating the operation of the driver. The automated driving system Sys accepts instructions for starting and ending Level 4 automated driving via the input device 23. The start/end instruction for the automated driving may be configured to be performed by voice input. Devices for voice input, such as a microphone, can also be included in the input device 23. An HMI Control Unit (HCU), for example, may be interposed between the on-board HMI 20 and the automated driving ECU 30. The HCU is a device that integrally controls information notification to the driver.

The automated driving ECU 30 is an ECU that executes part or all of the driving operation in place of the driver by controlling the traveling actuators 18 based on the detection results from the surrounding monitoring sensor 11 and the like. The automated driving ECU 30 is also referred to as the automated operation device. The traveling actuators 18 include, for example, a brake actuator as a braking device, an electronic throttle, and a steering actuator. The steering actuator includes an electric power steering (EPS) motor. Other ECUs, such as a steering ECU for steering control, a power unit control ECU for acceleration and deceleration control, and a brake ECU may be interposed between the automated driving ECU 30 and the traveling actuators 18.

The automated driving ECU 30 is mainly constituted of a computer with a processor 31, a memory 32, a storage 33, a communication interface 34, and a bus connecting these components. The memory 32 is a rewritable volatile storage medium, for example, a random access memory (RAM). The storage 33 is rewritable and nonvolatile, for example, a flash memory. The storage 33 contains a vehicle control program, which is a program executed by the processor 31. The vehicle control program also includes a notification control program that controls the notification modes of the information to the driver. Execution of the vehicle control program by the processor 31 corresponds to execution of the notification control method. The processor executing the processing for driving assistance may be separate from the processor executing the processing for the automated driving. The automated driving ECU 30 may have a plurality of processors 31.

The automated driving ECU 30 has a plurality of modes of operation with the different automation levels. As an example here, the automated driving ECU 30 is configured to be able to switch between a fully manual driving mode, a driving assistance mode, and an automated driving mode. Each operating mode differs in the range of driving tasks that the driver is responsible for, or in other words, the range of driving tasks in which the system intervenes. The system here refers to the automated driving system Sys, in practice the automated driving ECU 30. The operating mode can be paraphrased as a driving mode.

The fully manual driving mode is an operating mode in which the driver executes all the driving tasks. The fully manual driving mode corresponds to the automation level 0. The driving assistance mode is an operating mode in which the system executes at least one of the acceleration and deceleration and the steering operation. The driver is an executing entity the steering operation in the driving assistance mode, and this mode requires the driver to at least monitor the surroundings, such as in front of the vehicle. The fully manual driving mode and the driving assistance mode are driving modes in which the driver executes at least some of the driving tasks. Therefore, in this disclosure, the fully manual driving mode and the driving assistance mode are also described as an occupant-involved mode when they are not distinguished. The occupant-involved mode can also be referred to as a manual driving mode as an antonym for the automated driving mode.

The automated driving mode is the operating mode in which the system executes all the driving tasks. As an example here, the automated driving mode is the operating mode that executes the control equivalent to the automation level 4. The automated driving mode may be one that performs level 5 automated driving. The automated driving mode corresponds to a mode of operation in which sleep of the driver is allowed. The mode can be switched from the manual driving mode to the automated driving mode based on the operation signal input from the input device 23.

In the automated driving mode, the automated driving ECU 30 automatically performs the steering, the acceleration, the deceleration (in other words, braking), and the like of the vehicle such that the subject vehicle travels along the road to the destination set by the driver. Note that the automated driving mode is terminated due to the driver operation (so-called override) as well as a system limit, an ODD exit, and the like. The automated driving ECU 30 may be a device that performs the automated driving up to a point where an authority is scheduled to be transferred, which is set on the travel route to the destination. The planned point of the transfer of the own authority corresponds to the planned point of exit of the ODD.

The ODDs include, for example, (a) the traveled road is an expressway or a limited highway with a median strip and guardrails, and the like, (b) an amount of rainfall is equal to or less than a predetermined threshold, and (c) all or a predetermined number or more of the surrounding monitoring sensors 11 are operating normally. The traveled road is the road on which the subject vehicle is traveling. Other conditions such as the absence of parked vehicle on the street can also be included in the ODD. The conditions for determining whether the automated driving is possible or not possible, in other words, the detailed conditions defining the ODD, can be changed as needed.

<Configuration of Automated Driving ECU 30>

Figure 2:
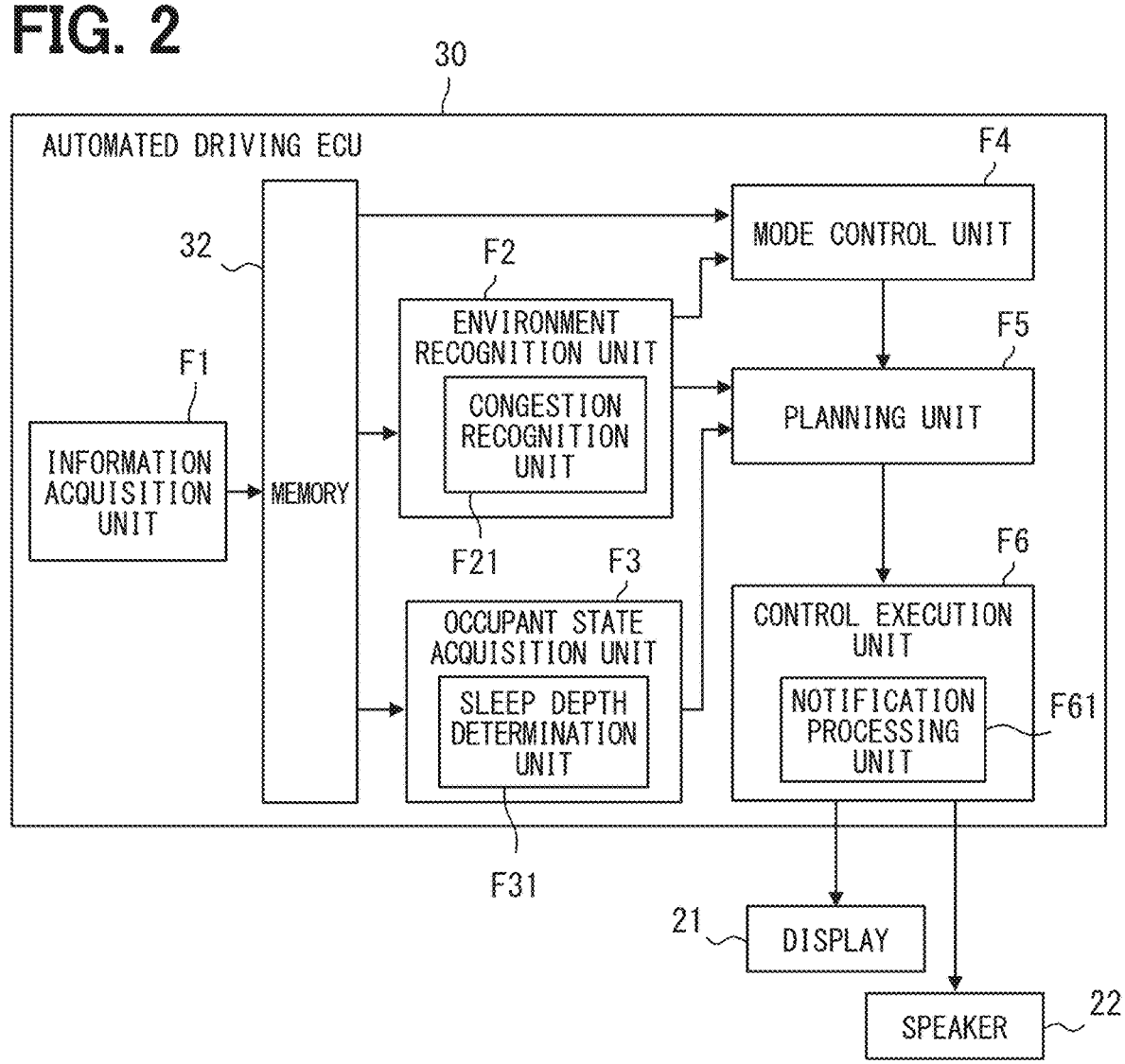
FIG. 2 is a functional block diagram of an automated driving ECU.

The automated driving ECU 30 has the functional units shown in FIG. 2, which are realized by executing the automated driving program. In other words, the automated driving ECU 30 includes an information acquisition unit F1, an environment recognition unit F2, an occupant state acquisition unit F3, a mode control unit F4, a planning unit F5, and a control execution unit F6.

The information acquisition unit F1 is configured to acquire a variety of information to perform vehicle control such as the automated driving and the driving assistance. "Acquisition" in this disclosure also includes generating/detecting data by internal operation based on data input from another input device/sensor, or the like. This is because the arrangement of functions in the system can be changed as needed.

For example, the information acquisition unit F1 acquires the detection results (that is, sensing information) from the various surrounding monitoring sensors 11, including the camera 111. The sensing information includes the positions, moving speeds, and types of another moving object, a geographic object, an obstacle, and the like that present in the vicinity of the subject vehicle. The information acquisition unit F1 also acquires the traveling speed, the acceleration, a yaw rate, an external illumination, and the like of the subject vehicle from the vehicle state sensors 12. In addition, the information acquisition unit F1 acquires the location information of the subject vehicle and the surrounding map information about the road structure from the locator 13.

The information acquisition unit F1, in cooperation with the wireless communication device 15, can acquire vehicle information transmitted by the inter-vehicle communication from the vehicle in front. The vehicle information may include a hazard lamp lighting status, whether or not/how much the brake is depressed, the acceleration, the traveling speed, and the location information. The information acquisition unit F1, in cooperation with the wireless communication device 15, acquires the dynamic map data for road sections that the subject vehicle is scheduled to pass within a predetermined time. The dynamic map data here includes the congestion information.

The information acquisition unit F1 also acquires information such as the operations of the driver for the automated driving system Sys based on signal from the input device 23. For example, the information acquisition unit F1 acquires the operation signal from the input device 23 for the start and end of the automated driving.

The information acquisition unit F1 acquires information (that is, determination material) from the occupant state sensor 16 to determine the state of the driver. Information that can be used to determine the state of the driver includes, for example, the pulse rate, the heart rate, a respiratory rate, body motions, degrees of eye opening, a frequency of blink execution, a degree of variation in blink intervals, eye balls movements, a posture, a body temperature, and a time elapsed since falling asleep. The pulse rate, the heart rate, the respiration rate, and the like can be represented in terms of the number of executions per minute or the like. The body motion can be classified into a coarse body motion, which is a large body motion such as turning over, and a fine body motion, which is a fine body motion as motion of limbs or head only.

Various types of information acquired sequentially by the information acquisition unit F1 are stored in a temporary storage medium, such as the memory 32, for example, and are used by the environment recognition unit F2, the occupant state acquisition unit F3, and the like. The various information can be classified by type and stored in a memory. The various information can be sorted and stored with the latest data first, for example. The data after a certain amount of time has elapsed since the acquisition may be discarded.

The environment recognition unit F2 recognizes the traveling environment of the subject vehicle based on the location information of the subject vehicle, surrounding object information, and the map data acquired by the information acquisition unit F1. For example, the environment recognition unit F2 recognizes the traveling environment of the subject vehicle through a sensor fusion process that integrates the detection results of the plurality of surrounding monitoring sensors 11, such as the camera 111 and the millimeter wave radar 112, with predetermined weights.

The traveling environment includes the position and the type of each object present in the vicinity of the vehicle, as well as the moving speed and a direction of movement thereof when it is a moving object. The traveling environment includes a curvature of the traveled road, the number of lanes, a subject lane number, a weather condition, a road surface condition, and whether or not the road is in the congestion section. The subject lane number indicates how many lanes the vehicle is traveling in from the left or right road edge. Identification of the subject lane number may be performed by the locator 13. The weather and the road surface condition can be identified by combining the recognition results of the camera 111 with the weather information acquired by the information acquisition unit F1. As for the road structure, it may be identified using the static map data as well as the recognition results of the camera 111. The environment recognition unit F2 acquires environmental information outside the vehicle relevant to the ODD, such as a road structure, the weather, and the road surface condition.

The environment recognition unit F2 also includes a congestion recognition unit F21, which is configured to detect the congestion present on the travel route of the subject vehicle. For example, the congestion recognition unit F21 recognizes the congestion section and a length thereof (that is, the congestion length) based on information received from the traffic information center and the like. Note that the congestion information distributed by the traffic information center may differ from an actual condition. The congestion recognition unit F21 may verify the received congestion information using at least one of the detection results of the surrounding monitoring sensors 11 and a behavior of the subject vehicle, and finally determine whether or not the congestion is present. In other words, the congestion recognition unit F21 may correct the congestion information received from the external device using at least one of the detection results of the surrounding monitoring sensors 11 and the behavior of the subject vehicle.

The congestion recognition unit F21 may use the vehicle speed information, the frequency of executing stops and starts, and the detection results of the surrounding monitoring sensors 11 to determine whether or not the area surrounding the subject vehicle corresponds to the congestion condition. Specifically, when the vehicle speed of the subject vehicle continues equal to or less than the congestion determination value for a predetermined time (for example, 5 minutes) or longer, the surrounding area is determined to be in the congestion condition. The congestion recognition unit F21 may increase the certainty of being in the congestion condition based on the fact that the preceding vehicle has turned on its hazard lamps. The behavior of the preceding vehicle can be employed as a determination material in determining whether or not the congestion condition is present. The congestion recognition unit F21 may also determine whether or not the congestion condition is present based on the vehicle information acquired through the inter-vehicle communication from a plurality of the vehicles in front. The congestion recognition unit F21 corresponds to a congestion information acquisition unit.

The occupant state acquisition unit F3 is configured to acquire the occupant state, such as whether the driver is awake or asleep, based on the information acquired by the information acquisition unit F1. The occupant state acquisition unit F3 includes a sleep depth determination unit F31 as a sub-function to determine a sleep depth of the driver. The sleep depth is a parameter indicating a depth of the sleep. As an example, the case in which the sleep depth is determined by classifying the sleep depth into three levels, from Level 0 to 2, will be described as an example. The higher the value for the sleep depth indicates, the deeper the sleep becomes. The sleep depth of Level 0 state corresponds to a state in which the driver is awake, that is, not sleeping. Level 1 corresponds to the light sleep state, so-called rapid eye movement (REM). Level 2 corresponds to the deep sleep state, so-called non-REM sleep. Non-REM sleep may be further subdivided into four stages, Stages 1 to 4. The sleep depth determination unit F31 may evaluate the sleep depth in total six levels: an awake state (Level 0), a REM sleep state (Level 1), and four levels of non-REM sleep (Levels 2 to 5). The sleep depth determination unit F31 has the function of determining whether the driver is asleep or not. The determination result of the sleep depth determination unit F31, such as the sleep depth, and the output of the occupant state sensor 16 correspond to sleep state information.

A variety of methods can be used as a method of determining sleep depth. The sleep depth determination unit F31 determines the sleep depth using a combination of the degrees of eye opening, the eye balls movements, the heart rate, the time elapsed since falling asleep, and the like. A sleep duration, which is a time elapsed since falling asleep, is measured based on a point in time when the driver is determined to have fallen asleep, that is, a point in time when the driver is determined to have shifted from the awake state to the sleep state. The fact that the driver has fallen asleep can be identified based on biometric information of the driver, for example, the eyes closed state continues for a predetermined time or longer. The sleep duration may be measured from the point in time when the driver enters into the system that he/she is about to go to sleep, as the starting point. For example, the starting point for the sleep duration may be a point in time when the driver seat is set in a resting posture.

In general, a respiratory rhythm and the pulse rate/the heart rate can be more unstable during the REM sleep than during the non-REM sleep. Therefore, the sleep depth determination unit F31 can determine the sleep depth based on whether or not the degrees of stability (dispersion) of the respiration rate, the heart rate, and the pulse rate per a certain amount of time is equal to or greater than a certain value. In addition, the body motion is less being observed during the REM sleep than during the non-REM sleep. Therefore, the sleep depth determination unit F31 can determine the sleep depth based on the number of the body motion observations per the certain amount of time and the magnitude of the body motion.

The depth of sleep repeats rise and fall in cycles of about 90 minutes. For example, the sleep depth determination unit F31 determines that the sleep depth is Level 1 when the elapsed time since falling asleep is less than 30 minutes, and determines that the sleep depth is Level 2 when the above elapsed time is 30 minutes or more and 60 minutes or less. When the elapsed time since falling asleep is 60 or more and 90 minutes or less, it may be determined to be Level 1. The correspondence between the time elapsed since falling asleep and the sleep depth may be represented as a map, a table, or the like. Otherwise, the sleep depth determination unit F31 may determine the sleep depth based on an amount of heat radiation from the body of the driver, the change trend and a distribution of body surface temperature, and a depth of respiration. Whether or not the driver is asleep, that is, whether or not the driver is in Level 0, can also be determined by various algorithms using the eye openings, the face direction, the posture, and other conditions. The timing at which the occupant is determined to have fallen asleep based on the degree of eye openings and the posture correspond to the timing of falling asleep.

The mode control unit F4 controls the operating mode of the automated driving ECU 30 based on the various information acquired by the information acquisition unit F1. For example, the mode control unit F4 determines to shift to the automated driving mode when a signal for the start of the automated driving is received from the input device 23, in the occupant-involved mode while the traveling environment satisfies the ODD. The mode control unit F4 then outputs a signal to the planning unit F5 requesting to shift to the automated driving mode. During the automated driving mode, when the traveling environment recognized by the environment recognition unit F2 no longer satisfies the ODD, or when the ODD is predicted not satisfied within a predetermined time, it determines to shift to the occupant-involved mode and notifies the planning unit F5 of the fact.

Furthermore, the mode control unit F4 determines to terminate the automated driving mode during the automated driving mode when the operation signal to terminate the automated driving mode or an override operation by the driver is detected from the input device 23. The mode control unit F4 then outputs signal to the planning unit F5 and the control execution unit F6 to switch to the manual driving mode. The override operation refers to an occupant operation on operating component such as the steering wheels or the pedals. When the automated driving ECU 30 detects that the override operation has been performed by the driver, the automated driving ECU 30 immediately transfers the driving authority to the driver and notifies the driver of the fact through the voice output or the like. At the end of the automated driving mode, the operating mode may be transitioned to the fully manual driving mode or the driving assistance mode. The transition destination at the end of the automated driving mode may be dynamically determined according to the situation, or may be pre-registered by the driver.

The planning unit F5 has a configuration that plans control content of execution as the driving assistance or the automated driving. For example, the planning unit F5 generates a traveling plan for traveling in the autonomous driving based on the recognition results of the traveling environment by the environment recognition unit F2 in the automated driving mode. A traveling plan can be referred to as a control plan. The traveling plan includes the traveling position, the target speed, and the steering angle at each time. In other words, the traveling plan may include schedule information on the acceleration and deceleration for speed adjustment in the calculated travel route and schedule information on the amount of the steering.

For example, the planning unit F5 performs a route search process to determine the travel route from the position of the subject vehicle to the destination as a medium-and-long term travel plan. At that time, the planning unit F5 calculates the estimated arrival time, which is an estimated arrival time at the destination. The planning unit F5 also generates a short-term control plan for travel control that is consistent with the medium-and-long term travel plan. For example, the planning unit F5 generates, as a short-term control plan, for example, the travel route for traveling in the center of the recognized subject lane as the traveling plan, or generates a travel route that follows the behavior or a traveling trajectory of the recognized preceding vehicle as the traveling plan. The control plan created by the planning unit F5 is input to the control execution unit F6.

In addition to the control plan directly related to the travel of the vehicle, the planning unit F5 also formulates plans related to the notification process for the occupants using the notification device such as the display 21. For example, the planning unit F5 determines timings of a behavior alert indicating a scheduled vehicle behavior, such as a lane change, overtaking, a deceleration, and the like, and the notification of the congestion information, depending on the situation. In other words, the planning unit F5 also creates a control plan for the notification device for notification of the congestion information.

The control execution unit F6 generates control command based on the control plan formulated by the planning unit F5 and outputs them sequentially to the traveling actuator 18, display 21, and the like. The control execution unit F6 also controls a lighting status of the direction indicators, the headlights, the hazard lamps, and the like, according to the traveling plan and the external environment, based on the plan of the planning unit F5 and the external environment.

The control execution unit F6 includes a notification processing unit F61 as a sub-functional unit for notifying/suggesting to the occupants using the notification devices such as the display 21 and the speaker 22. Various notifications/suggestions can be realized by displaying images on the display 21 or by outputting voice messages from the speaker 22. For example, the notification processing unit F61 notifies the congestion information present on the travel route of the subject vehicle at the timing set by the planning unit F5, using at least one of the display 21 and the speaker 22. The notification mode of the congestion information is adjusted according to the state of the driver and the congestion length, as described next. The notification mode may be determined by the planning unit F5. The functional arrangement of the notification processing unit F61 and the planning unit F5 can be changed as needed. When the planning unit F5 determines the execution timing and the notification mode for the notification on the congestion, it can be interpreted that the planning unit F5 is in effect the congestion notification processing unit.

<Congestion Response Process During Automated Driving>

Figure 3:
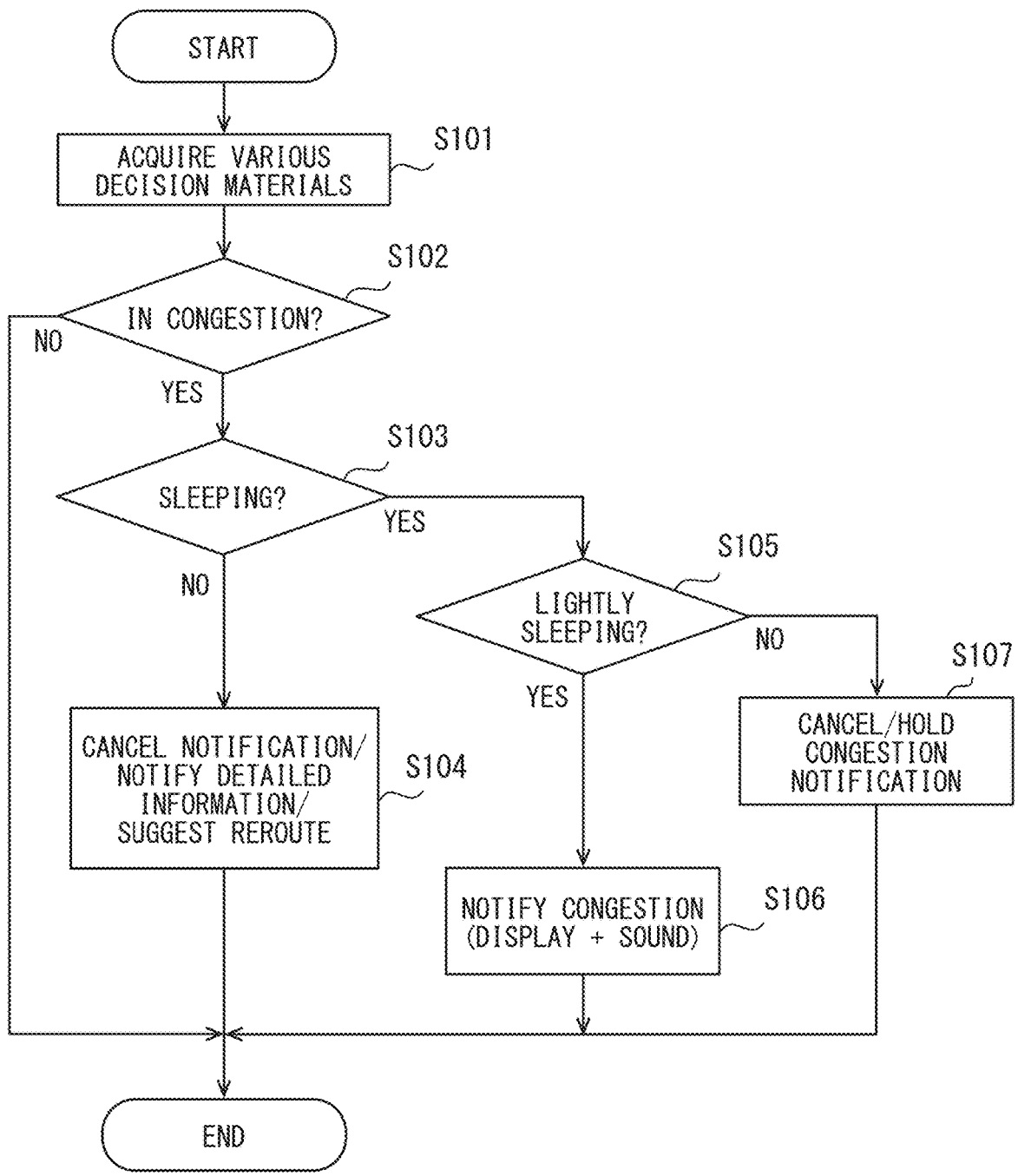
FIG. 3 is a flowchart showing an example of a congestion response process.

Here, the flowchart shown in FIG. 3 is used to describe the congestion response process during the automated driving, which is performed by the automated driving ECU 30. The congestion response process shown in FIG. 3 is started at predetermined notification cycles, for example, every minute or five minutes during, for example, the automated driving. The congestion response process shown in FIG. 3 includes Steps S101 to S109. The various flowcharts shown in this disclosure are all examples, and the number of steps constituting the flowcharts and the order in which the processes are executed can be changed as needed. The information acquisition unit F1, the environment recognition unit F2, the occupant state acquisition unit F3, the mode control unit F4, the planning unit F5, and the control execution unit F6 can be read as the processor 31 as the performing entity of the following steps. Similarly, the description of the processor 31 as the entity performing the processes described below can be read as any of the information acquisition unit F1, the environment recognition unit F2, the occupant state acquisition unit F3, the mode control unit F4, the planning unit F5, and the control execution unit F6, as appropriate.

First, Step S101 is a step in which the information acquisition unit F1 acquires various information to be used in the subsequent process. For example, the information acquisition unit F1 acquires information on the behavior of the vehicle in front, the congestion information, the behavior of the subject vehicle, and the driver state information. The behavior of the vehicle in front refers to the states of the hazard lamps and the brake lamps, the vehicle speed, and the like. The behavior of the subject vehicle refers to the vehicle speed, the frequency of stops/starts, the degree to which the brake pedal is depressed and the like of the subject vehicle.

Step S102 is a step in which the congestion recognition unit F21 determines whether or not the traveling environment of the subject vehicle corresponds to the congestion condition based on the information acquired by the information acquisition unit in Step S101. When the traveling environment of the subject vehicle corresponds to the congestion condition, in other words, when the subject vehicle is caught in the congestion. For example, the congestion recognition unit F21 determines whether or not the traveling environment of the subject vehicle corresponds to the congestion condition based on the congestion information distributed from the traffic information center and the location information of the subject vehicle or the vehicle speed information. When the traveled road is the limited highway, the congestion recognition unit F21 may determine that the subject vehicle is caught in the congestion based on the fact that the vehicle in front is stopped or that the vehicle speed of the preceding vehicle or the subject vehicle is equal to or less than the congestion determination value. The determination result in Step S102 are stored in the memory 32. The situation where the subject vehicle will soon be at the end of the congested line can also be included in the state in which the subject vehicle is caught in the congestion.

When the traveling environment of the subject vehicle is determined to correspond to the congestion condition, Step S103 is executed. On the other hand, when the traveling environment of the subject vehicle is determined not to correspond to the congestion condition, this flow is terminated.

Step S103 is a step in which the sleep depth determination unit F31 determines whether the driver is awake or not based on the driver state information acquired in Step S101. Step S103 can also be interpreted as the step of determining whether the sleep depth corresponds to level 0 or not. When the driver is awake in Step S103, that is, the sleep depth is determined to be 0, the processor 31 executes Step S104. On the other hand, when the driver is determined to be asleep, the processor 31 executes Step S105.

Step S104 is a step in which the notification processing unit F61 performs the non-sleep time notification process. The non-sleep time notification process is used to notify the congestion information in a mode that assumes the driver is awake. The non-sleep time can be paraphrased as waking time. When the driver is awake, the driver likely recognize that the congestion is occurring. Therefore, the non-sleep time notification process does not perform notification only that the congestion is occurring.

The non-sleep time congestion notification process can be a process used to notify the supplemental information or, in other words, the detailed information about the congestion that the subject vehicle is facing. For example, in Step S104, the notification processing unit F61 displays the congestion length as the detailed information about the congestion. The notification processing unit F61 may display, as the detailed information, a required time to pass through the congestion section, the cause of the congestion, the degree of delay in the estimated arrival time, and the updated estimated arrival time. Various information may be displayed with a predetermined notification sound.

In the non-sleep time congestion notification process, the output of voice messages may be omitted in consideration of possibility of causing annoyance to the occupant. However, when the degree of delay in the estimated arrival time due to the congestion exceeds a predetermined allowable delay time (for example, 30 minutes), a voice message corresponding to the above detailed information may be output. When the detailed information about the congestion to be notified has not yet been acquired, the non-sleep time notification process may be held until the detailed information can be acquired. In another mode, Step S104 may be the step of discontinuing the notification on the congestion planned by the planning unit F5.

Step S105 is a step in which the sleep depth determination unit F31 determines whether the sleep of the driver is light or not, in other words, whether the sleep depth corresponds to Level 1 or Level 2, based on the driver state information acquired in Step S101. When the sleep of the driver is light, that is, the sleep depth is determined to be 1, the processor 31 executes Step S106. On the other hand, when the driver is deeply asleep, in other words, when the sleep depth is determined to be 2, the processor 31 executes Step S107. In this embodiment, the sleep depth of 2 corresponds to the reference value for changing the notification mode during sleep.

Step S106 is a step in which the notification processing unit F61 performs a light sleep notification process. The light sleep notification process is a process used to notify the congestion information in the mode assuming that the driver is in a light asleep. When the driver is asleep, the driver is less likely to recognize that the driver is caught in the congestion. In the light sleep notification process, a congestion notification image, which is an image indicating that the congestion is occurring, is displayed on the display 21. The congestion notification image may include a text message indicating that the congestion is occurring. The congestion notification image may be a pictogram, or an icon image, representing the congestion. The congestion notification image may include the detailed information such as the length of congestion, the time required to pass through the congestion, and the cause.

In addition, the notification processing unit F61 causes a predetermined notification sound to be output from the speaker 22 in conjunction with the display of the congestion notification image as the light sleep notification process. Instead of the notification sound, a voice message may be output. Outputting the notification sound or the voice message is expected to have the effect of awaking the driver and making him or her aware that the vehicle is in the congestion condition. In addition, when the sleep is light, the physical/mental burden associated with awakening is relatively small, reducing the possibility of causing annoyance to the driver.

In Step S107, the notification processing unit F61 determines not to execute the congestion notification (that is, cancel the notification). Step S107 may be a step of determining to hold the congestion notification process until the sleep depth of the driver becomes 0 or 1. Forcing the driver to wake up by the notification of the congestion information while the driver is deeply asleep may cause annoyance to the driver. In addition, when the driver is deeply asleep, even when the notification is performed, the occupant will not wake up and it may be an unnecessary notification. Under such circumstances, the notification processing unit F61 cancels/holds the congestion notification when the driver is deeply asleep. Putting the notification on hold is equivalent to postponing it until the sleep depth becomes less than the reference value or after a predetermined time (for example, 30 minutes). Changing the notification mode includes canceling/holding (postponing) notification.

The processor 31 may be configured not to re-execute notification of the congestion at a location (that is, the notified congestion) when an acknowledged signal is acquired via the input device 23 within a predetermined time after the notification of the congestion at the same location is performed. The acknowledged signal is an operation signal indicating that the driver has acknowledged (approved) the notified information. As a precondition for the above configuration, the notification process of the information on the congestion may be configured to require the occupant to perform an acknowledgement (approval) operation. The representation "point" here includes a concept of a section having a predetermined length or an area.

In the case where the driver is asleep when the congestion information is notified for a certain location, the processor 31 can resume a regular execution of the congestion response process after a pause period, for example, 10 minutes. The pause period corresponds to the period during which the congestion response process is suspended. The notification content of the congestion, such as the length of congestion and the time required to pass through the congestion, may be updated at any time.

According to the congestion response process described above, when the driver is lightly asleep, the notification on the congestion is performed. This configuration reduces the possibility of a significant delay in arrival time without the driver being aware of the delay. Note that the significant delay here refers to tardiness of 30 minutes or an hour or more, for example, depending on a local custom of use.

The above also describes the mode in which the notification is suspended or held when the driver is determined to be deeply asleep, but the congestion notification by displaying images and the like may also be performed when the driver is determined to be deeply asleep. The processor 31 may be configured to notify the congestion information with the sound and the image when the driver is determined to be asleep, while using the image display alone to notify the congestion information when the driver is determined to be deeply asleep. Depending on the configuration of the occupant state sensor 16, the sleep depth can be erroneously determined. The system may determine that the sleep depth of the driver is 2, but the actual sleep depth is possibly 1 or 0. When the driver was sleeping lightly, displaying the congestion notification image will make it easier for the driver to recognize that the driver is caught in the congestion. According to the configuration in which the processor 31 executes the image display even when the driver is determined to be deeply asleep, the driver's recognition of being caught in the congestion can be improved.

In addition, the above describes the configuration that employs the notification mode that provides less stimulation to the occupant when the driver is determined to be deeply asleep than when the driver is determined to be lightly asleep, but the configuration is not limited thereto. In other embodiments, the processor 31 may be configured to execute the notification in a more stimulating mode when the driver is determined to be deeply asleep than when the driver is determined to be lightly asleep. For example, the processor 31 executes the notification with the image display and the notification sound when the driver is determined to be lightly asleep. On the other hand, when the driver is determined to be deeply asleep, the processor 31 may 31 may be configured to perform the notification with the image display and the voice message. When the driver is determined to be deeply asleep, the processor 31 may notify the congestion information by vibrating the vibrator in addition to displaying the image and outputting the sound. With the configuration, it is easier for the driver to recognize that the driver is caught in the congestion even when the driver is deeply asleep.

Visual elements that constitute the notification mode of the information are, for example, whether or not the image is displayed, the content of the image to be displayed, the brightness, the size, the location of the display, and the intensity of the light. Auditory elements that constitute the notification mode are the presence or absence of the sound output, the volume, the pitch of the sound, and whether the output sound is simply the notification sound, the voice message, or the like. Tactile elements that constitute the notification mode are the presence or absence of the vibration, the intensity of the vibration, the rhythm of the vibration, and the like. Increasing the stimulation to the occupant can be achieved, for example, by making the sound output from the speaker 22 louder or longer in length. Intensifying the stimulation to the occupant may be achieved by increasing the intensity of the light output from the display 21 or the ambient light, or by intensifying the vibration generated by the vibrator. Intensifying the stimulation to the occupant may be achieved by increasing the types of the stimulation applied to the occupant.

In this disclosure, the notification in a mode intended to awake the driver is referred to as a notification in a conspicuous mode. The notification of the congestion information in the conspicuous mode is also referred to as the congestion notification in the conspicuous mode. The notification in the conspicuous mode involves the output of the voice message/the sound effect at a volume having a predetermined value or more, or the application of the vibration. The conspicuous mode corresponds to the outputting of the stimulation in a sufficient intensity to awake the driver. Performing the notification in the conspicuous mode is equivalent to performing a process to awake the driver. On the other hand, the notification in a relatively less stimulating mode than the congestion notification in the conspicuous mode is also referred to as the notification in a discreet mode. The discreet mode refers to a notification mode that intends not to awake the sleeping occupant or cause annoyance to the occupant. The notification in the discreet mode means the notification in a mode in which the image display is the main focus, no vibration is applied to the driver, and the output volume is equal to or less than a predetermined value. Setting the output volume equal to or the predetermined value includes not outputting sound. The notification in the discreet mode may be accompanied by the output of sound effects at a volume that does not cause annoyance. The sound level that does not cause annoyance is, for example, 55 dB, or the noise level in the car plus 3 dB. The discreet mode can be paraphrased as a discreet mode. The automated driving ECU 30 of the present embodiment is configured to be able to control the notification mode in two levels: conspicuous mode and discreet mode. Certainly, the processor 31 may be configured to be able to select from three or more modes of the notification mode, each of which has a different stimulation intensity, according to the sleep depth of the driver and the like.

In addition, the processor 31 can, as one embodiment, display a congestion notification image that includes the detailed information about the congestion, regardless of the state of the driver. With the configuration of displaying the congestion notification image that includes the detailed information, even when the driver is asleep, the passenger can be notified of the congestion in detail. As a result, when the degree of influence of the congestion is at an unallowable level, a measure is possibly taken, such as having the passenger to awake the driver.

The notification mode of the congestion information may be the same in the case of deep sleep and light sleep. The processor 31 may be configured to change the notification mode of the congestion information depending on whether the driver is awake or asleep, without determining the depth of sleep. In turn, the sleep depth determination unit F31 may be configured to determine whether the driver is asleep or not.

The above describes the operation of the notification processing unit F61 in a scene where Level 4 or Level 5 equivalent automated driving is being executed. When the automated driving is not being executed, it is sufficient for the notification processing unit F61 to perform the notification of the congestion in a predetermined mode (that is, in the discreet mode). The notification processing unit F61 may be configured such that when the automated driving is not being executed, the notification processing unit F61 does not perform the notification that does not include the detailed information about the congestion, similarly to as if the driver were awake.

<Another Example of Congestion Response Process During Automated Driving>

Figure 4:
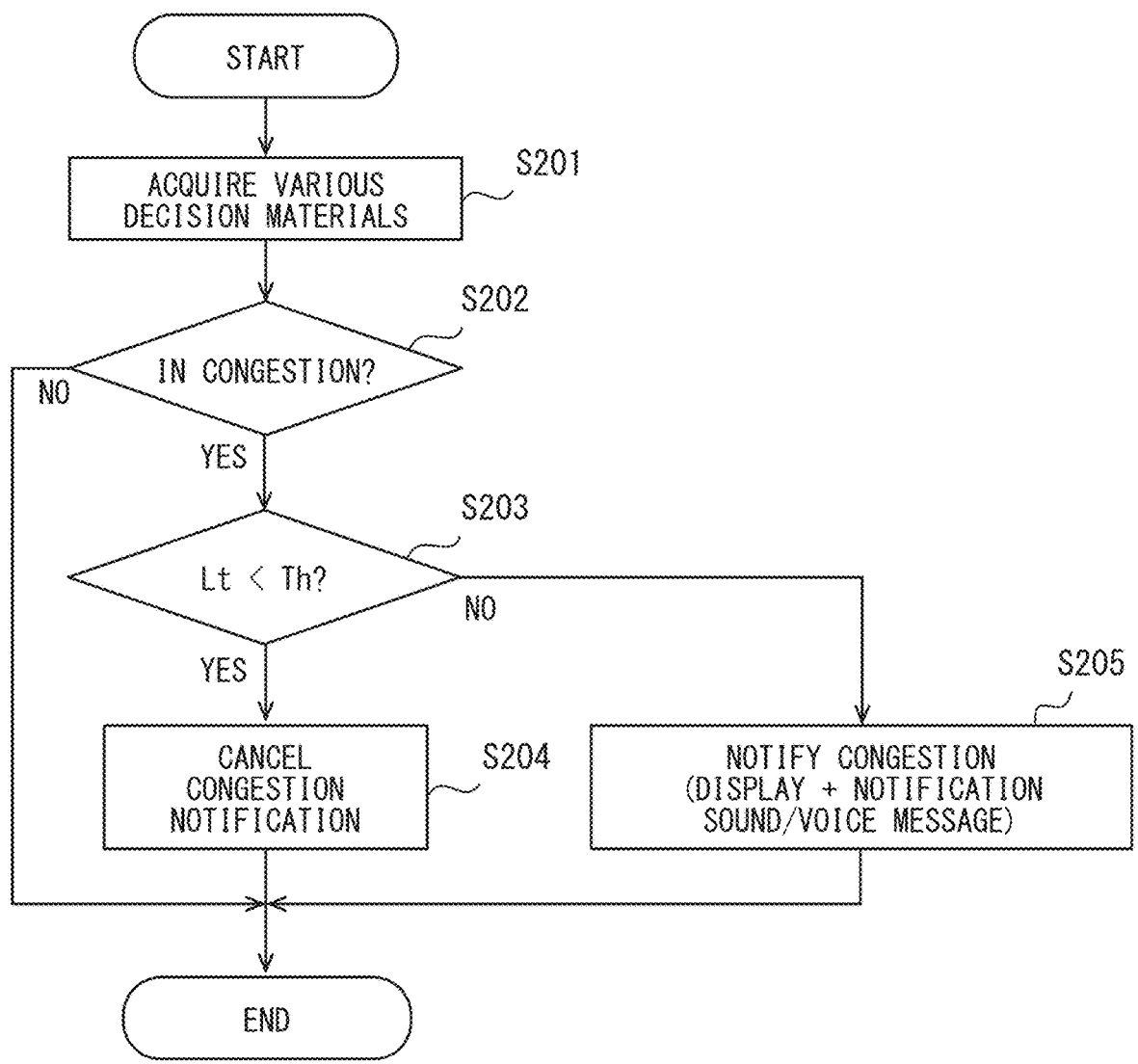
FIG. 4 is a flowchart showing another example of a congestion response process.

Another example of the congestion response process during the automated driving is described here using the flowchart shown in FIG. 4. Similarly to the congestion response process shown in FIG. 3, the congestion response process shown in FIG. 4 is executed at a predetermined notification cycle, for example, every minute or five minutes during the automated driving, to notify information about an unnotified congestion. However, the processor 31 can operate to consider the congestion information for a given location to be unnotified when the driver is asleep when the congestion information is notified for the location. Unnotified information can be paraphrased as information that has not been recognized/confirmed by the occupants. The congestion response process shown in FIG. 4 may be performed on the condition that the driver is executing a second task, such as sleeping, reading, or operating a smartphone. In other words, the congestion response process shown in FIG. 4 may be performed on the condition that the driver is presumed to be unaware of the outside of the vehicle.

The congestion response process shown in FIG. 4 includes Steps S201 to S205. Steps S201 and S202 are the same as Steps S101 and S102. Step S203 is a step of determining whether or not the congestion length Lt, which is a length of the congestion present ahead the subject vehicle, is less than a predetermined allowable threshold Th, based on the information acquired in Step S201. The congestion length Lt may be defined in units of distance or defined in in units of time. The allowable threshold Th is a threshold for determining whether or not the congestion information should be notified, and can be a predetermined design value. The allowable threshold Th may also be entered by the driver. The allowable threshold Th can be set to 15 minutes, 30 minutes, or 1 hour, for example. Certainly, the allowable threshold Th may be set in units of distance, such as 1 km. There may also be both a distance allowable threshold Th and a time allowable threshold Th.

When the congestion length Lt is less than the allowable threshold Th (YES in Step S203), the congestion notification processing unit F61 stops outputting the congestion information (Step S204). On the other hand, when the congestion length Lt is equal to or greater than the allowable threshold Th (NO in Step S203), the notification processing unit F61 notifies about the congestion by displaying the image and outputting the sound (Step S205). The sound output in Step S205 may be the notification sound or the voice message about the occurrence of the congestion.

According to the above configuration, when the congestion length Lt is equal to or greater than the allowable threshold Th, the image or the sound is output for the congestion notification. Therefore, even when the driver is asleep, the driver may be awakened by the stimulation by the notification and become aware of the presence of congestion. In other words, the awareness of the driver of being caught in congestion can be enhanced compared with the case where no notification is provided. This, in turn, reduces the possibility of the significant delay in arrival time without the driver being aware of the delay. When the congestion length Lt is less than the allowable threshold Th, the notification on the congestion is canceled. With this configuration, unnecessary notifications can be suppressed, thus reducing the possibility of causing annoyance to the driver.

In other words, the above configuration enables both comfortability and convenience for the driver.

While the above describes the modes in which the system response is changed according to the congestion length Lt, instead of the congestion length Lt, the delay amount in arrival, which is a range of variation of the estimated arrival time due to the congestion, may be used. For example, the processor 31 may be configured to perform the notification when the delay amount in arrival due to the congestion is equal to or greater than the predetermined allowable threshold, while omitting the notification when the delay amount in arrival is less than the allowable threshold. The longer the congestion length is, the larger the degree of influence of the congestion on the estimated arrival time becomes. The congestion length or the delay amount in arrival corresponds to an indicator of the degree of influence of the congestion on the control plan. The delay amount in arrival can be calculated based on a point in time when the driver sets the destination or a point in time when the estimated arrival time is last notified to the awake driver.

The processor 31 may also change its response according to the cause (type) of the congestion. For example, the processor 31 may change a timing of the notification of the congestion or the intensity of the stimulation given to the driver at a time of the notification depending on whether the cause of the congestion is an accident or not. When the congestion is caused by the accident, it is likely to last longer than a natural congestion, due to rescue/removal efforts. Therefore, the processor 31 may promptly perform the notification when the congestion is caused by the accident, while holding/canceling the notification when the congestion is caused by something other than an accident (for example, natural traffic congestion). The processor 31 may 31 may also generate the vibration along with the congestion notification image when the cause of the congestion is the accident, while the vibration stimulation is not applied to the driver when the cause of the congestion is not an accident.

While the above is a description of the embodiments of this disclosure, the present disclosure is not limited to the embodiments described above. Various modifications described below are also included in the technical scope of the disclosure, and furthermore, the disclosure may be implemented with various changes within the scope that does not depart from the gist other than those described below. For example, the various supplements and modifications below may be combined as appropriate to the extent that no technical contradictions arise. Parts that have the same functions as the parts described above may be omitted from the description with the same symbols. If only a part of the configuration is mentioned, the above description can be applied to the other parts.

Modification (1)

The technical concepts described using FIG. 3 and FIG. 4 may be implemented in any combination as appropriate. In other words, the processor 31 may 31 may be configured to change the notification mode of the information on the congestion according to both the sleep depth of the driver and the impact of the congestion (for example, the congestion length).

FIG. 5 is a diagram showing an example of the notification modes according to the combinations of the sleep depth of the driver and the congestion length. The longer the congestion length is, the stronger the mode the processor 31 may employ. When the driver is deeply asleep, the processor 31 holds the notification when the congestion length is less than the allowable threshold, and performs the notification when the congestion length is equal to or greater than the allowable threshold. The notification mode when the congestion length is equal to or greater than the allowable threshold with the sleep depth of 2 is made to be stronger than when the congestion length is equal to or greater than the allowable threshold with the sleep depth of 1. Accordingly, it is expected to have the effect of awaking the driver who is deeply asleep and making it easier for the driver to recognize that the driver is in a relatively long congestion situation when the congestion length is equal to or greater than the allowable threshold.

Modification (2)

The processor 31 may perform a reroute suggestion when the driver is awake and the congestion length is equal to or greater than the allowable threshold. The reroute suggestion is a process that suggests employing a different route that avoids the congestion. When the processor 31 receives a response signal from the input device 23 in response to the reroute suggestion to the effect that it is acceptable to change the travel route, the processor 31 continues the automated driving on the new route. With the configuration, the processor 31 can continue the automated driving on the route that avoids the congestion under the approval of the driver when the congestion length is equal to or greater than the predetermined value. The processor 31 can omit the notification of the congestion when the driver is awake and the congestion length is less than the allowable threshold. This is because when the congestion length is less than the allowable threshold, the influence on the estimated arrival time is small and therefore less useful. By suppressing the notification of low useful information, the possibility of causing annoyance to the driver can be reduced.

Modification (3)

When the driver is asleep, the processor 31 may awake the driver with the vibration of the vibrator or the like and then, or at the same time, perform the congestion notification. The processor 31 may be configured to perform an awaking process using at least one stimulation of the vibration, the light, and the sound prior to the congestion information notification.

For example, the processor 31 may be configured to execute the awaking process prior to the congestion information notification only when the congestion length or the delay amount in arrival is equal to or greater than the allowable threshold. The processor 31 may be configured to execute the awaking process and then perform the congestion information notification based on the sleep depth having transitioned from 2 to 1.

With the above-described configuration, it is easier for the driver to recognize the driver is caught in congestion. In addition to the allowable threshold for the congestion notification, the automated driving ECU 30 may have a set awaking threshold for an awaking process. The processor 31 may perform the awaking process and the congestion information notification process based on the congestion length being equal to or greater than the awaking threshold when the driver is asleep. A threshold for light sleep, which is the awaking threshold applied when the sleep is light, and a threshold for deep sleep, which is the awaking threshold applied when the sleep is deep, may be provided separately. When the thresholds for light sleep is set to 5 km, the threshold for deep sleep can be set to 10 km or the like. The threshold for deep sleep is set longer than the thresholds for light sleep to allow reducing the possibility of waking the driver when the driver is deeply asleep. This reduces the possibility of causing discomfort to the driver and allows the driver to recognize the fact when a scene is likely to cause a significant delay in arrival time.

Modification (4)

The processor 31 may be configured to acquire whether or not the delay to the destination is allowed in cooperation with the on-board HMI 20 before the driver falls asleep, and when the delay is allowed, no notification on the congestion is provided. Whether or not to allow the delay to the destination can be determined by the signal from the input device 23. The processor 31 may be configured to acquire an allowable amount of time as the delay in arrival and not provide the notification on the congestion when the assumed delay time is less than the set allowable amount of time. The allowable time can be interpreted as the aforementioned allowable threshold.

Modification (5)

The processor 31 may perform a response setting confirmation process, for example, triggered by setting the driver seat to the resting posture or by performing an operation to set the driver seat to the resting posture. The response setting confirmation process is a process that requests the driver to confirm the operational settings of the congestion response process. The operational setting of the congestion response process refer, for example, to whether the delay to the destination is allowed or not, an allowable congestion length, and the like. The allowable congestion length corresponds to the allowable threshold. The data indicating these setting contents correspond to setting Information.

The response setting confirmation process includes, for example, displaying a screen requesting for input of the allowable congestion length on the display 21 and determining the allowable threshold based on the signal from the input device 23. The processor 31 may execute the response setting confirmation process triggered by the driver's drowsiness level becoming equal to or higher than a predetermined value during the automated driving, the start of automated driving, the driver performing an operation to change the response setting, or the like. The drowsiness level can be determined by various algorithms based on the signal from the occupant state sensor 16. The automated driving ECU 30 may be configured to be able to acquire the allowable thresholds by voice input (voice recognition).

Modification (6)

The processor 31 may be configured to acquire the driver's desired notification suspension time based on the signal from the input device 23 and suspend the notification about the congestion until the notification suspension time has elapsed after the driver enters sleep. The notification suspension time corresponds to the time to suspend the notification of the congestion or to the time to suspend a notification other than emergency information related to safety. The notification suspension time corresponds to a parameter for the driver to acquire a comfortable sleep or rest of the driver.

The notification suspension time indirectly indicates the length of the sleep time desired by the driver. Therefore, the notification suspension time can be referred to as a desired sleep time. The notification suspension time, or in other words, the desired sleep time, can be acquired through the response setting confirmation process. The initial value of the desired sleep time is, for example, 0 minutes. The desired sleep time can take values from 0 to 90 minutes, for example. The desired sleep time may be set by the driver to any value.

Figure 6:
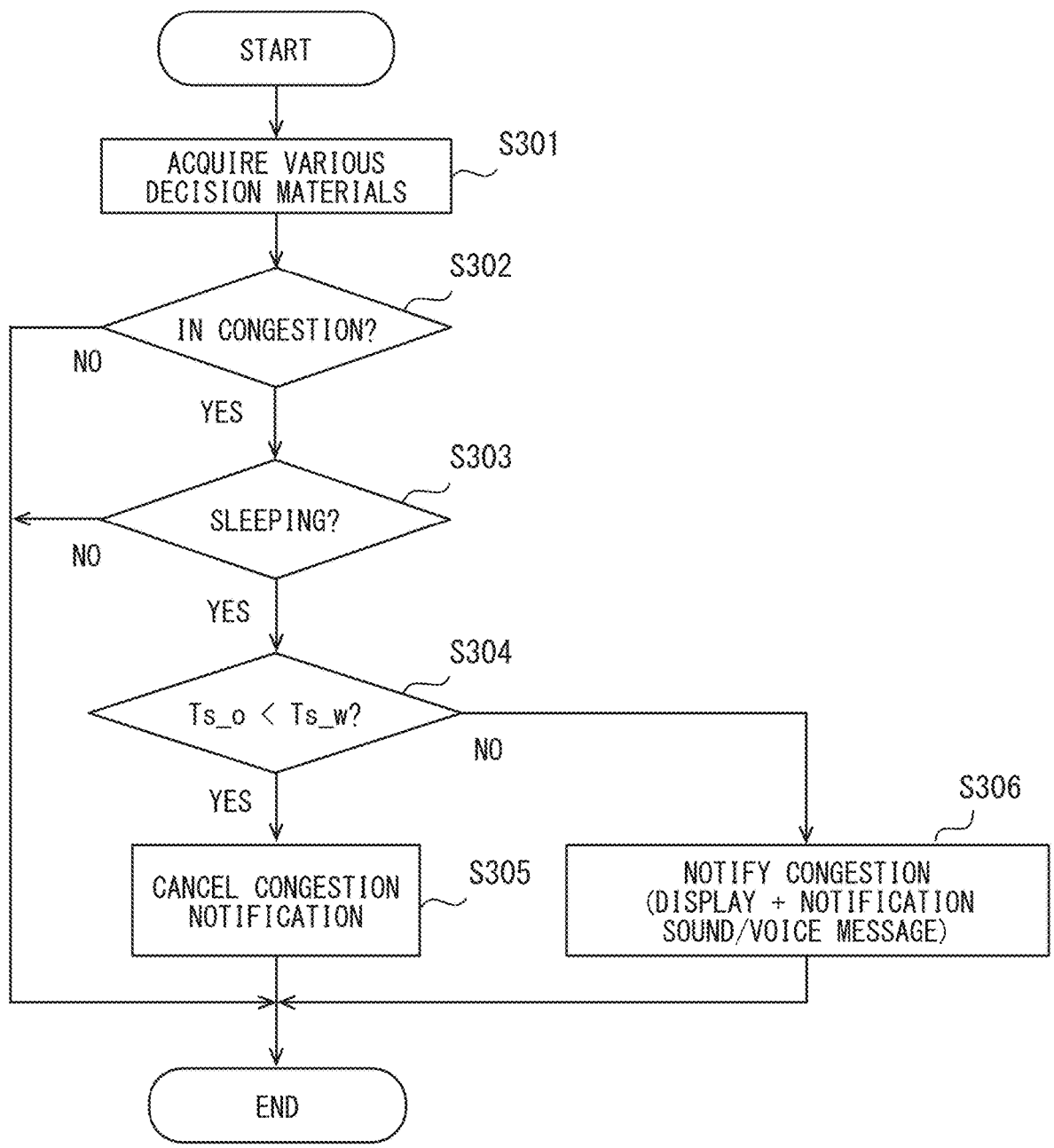
FIG. 6 is a flowchart showing another example of a congestion response process.

FIG. 6 is a flowchart describing the operation of the processor 31 when controlling the notification regarding the congestion using the desired sleep time. FIG. 6 also corresponds to another example of the congestion response process. Steps S301 to S303 shown in FIG. 6 are the same as steps S101 to S103. That is, the processor 31 acquires various types of information (Step S301) and determines whether the traveling environment is in congestion based on the acquired information (Step S302). When the traveling environment is determined to be in congestion, whether the driver is awake or not is determined based on the driver state information acquired in Step S301. When the driver is asleep, whether or not the sleep duration (Ts_o) is less than the desired sleep time is determined (Ts_w) (step S304). Ts_o in the figure indicates the measured sleep duration, and Ts_w indicates the desired sleep time, or in other words, the notification suspension time.

When the sleep duration is less than the desired sleep time (YES in Step S304), the notification about the congestion is canceled (Step S305). On the other hand, when the sleep duration is equal to or greater than the desired sleep time (NO in Step S304), the notification of the congestion is performed (Step S306). The notification mode may be in the conspicuous mode. Certainly, the notification mode in Step S306 may be a discreet mode.

With the configuration described above, the notification of the congestion is not performed while the sleep duration is less than the desired sleep time. Thus, the driver can continue to sleep for the desired time. The technical concepts described using FIG. 6 can be performed in combination with the aforementioned embodiments and various supplementary examples as appropriate. For example, the notification mode (stimulation intensity) may be changed according to the sleep depth of the driver. When the driver is awake, the notification may be canceled as in S104.

Supplement to Embodiments and the Like:
Modification (7)

When the driver instructs the processor 31 not to avoid the congestion/to maintain the current route after the notification on the congestion and the like in Steps S104, S106, S205, and the like are performed, the processor 31 does not change the route and maintains the current route. The current route refers to the travel route that is currently set. The current route corresponds to the route set by the driver, in other words, the route that has been agreed upon by the driver. The current route is not necessarily limited to the route set at the time of departure. The route that the driver re-selects based on the suggestion from the system after the start of travel also corresponds to the current route.

Figure 7:
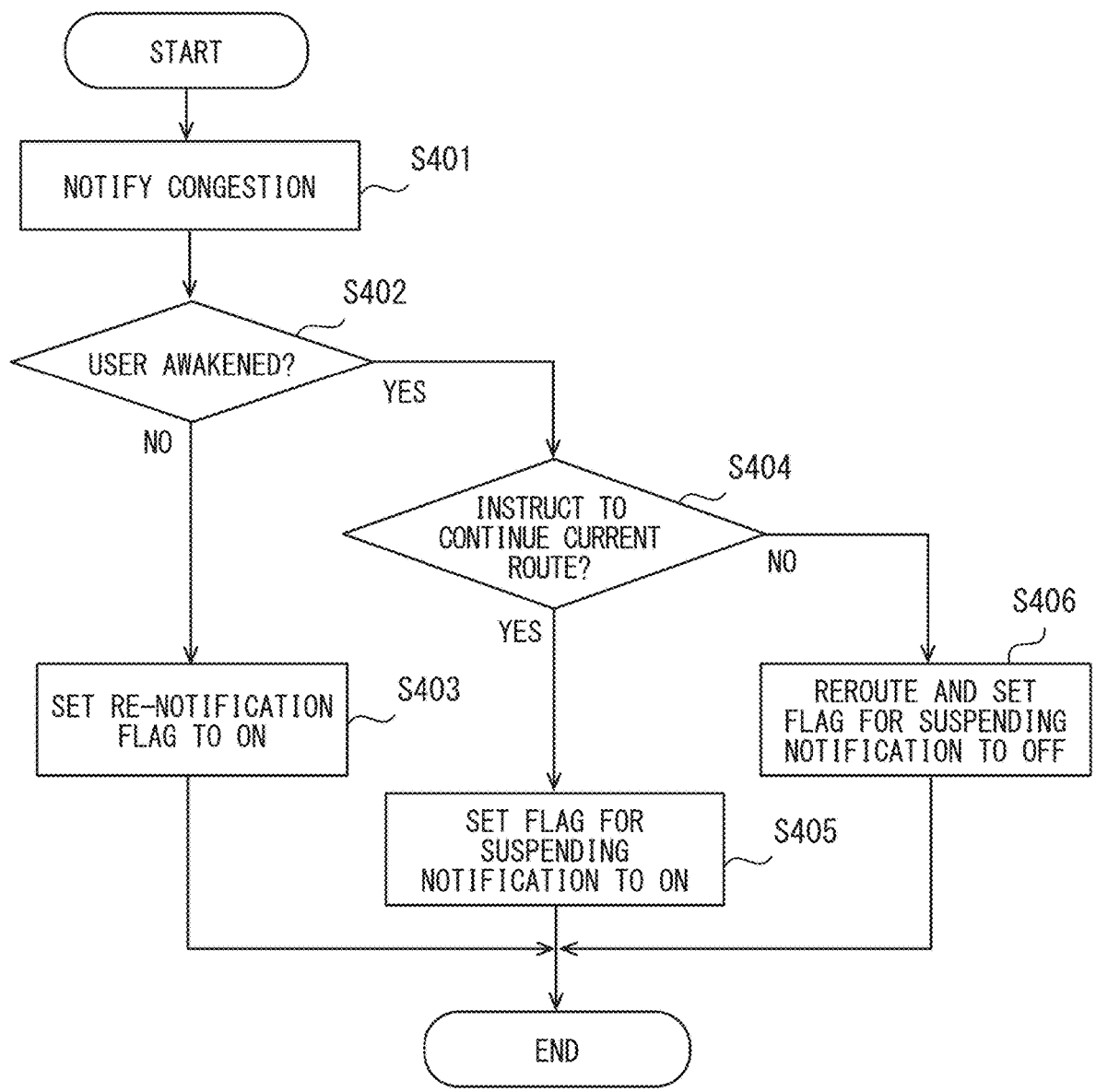
FIG. 7 is a flowchart for describing a process of controlling the next and subsequent notification regarding the congestion according to an instruction of a driver for a congestion that has been already passed.

The processor 31 may set a re-notification flag to ON (Step S403) when the driver's awaking is not detected (NO in Step S402) after the notification on the congestion and the like are performed as shown in FIG. 7 (Step S401). The re-notification flag is a processing flag to re-execute the notification. The processor 31 performs the notification of the congestion at predetermined time intervals when the driver is in sleep state and the re-notification flag is set to ON. The re-notification flag is set to OFF at an initial state.

The processor 31 also sets the re-notification flag to OFF when it detects that the driver has woken up. The initial state here refers to a state immediately after a power supply for traveling is set to ON and the automated driving ECU 30 is activated.

When the driver is awakened and chooses to maintain the current route (YES in Step S404) after the notification on the congestion and the like are performed, the processor 31 sets a flag for suspending notification to ON (Step S405). On the other hand, when the driver is awakened after the notification on the congestion and the like are performed, and the driver chooses not to maintain the current route (Step S404 NO), the processor 31 changes the route and sets the flag for suspending notification to OFF (Step S406). The flag for suspending notification is a flag to stop (cancel) the notification of the congestion. The flag for suspending notification is initially set to OFF. The processor 31 stops the notification of the congestion while the flag for suspending notification is ON.

According to the above configuration, when the subject vehicle is caught in a new (different) congestion, the processor 31 automatically applies the driver's instructions for the previous congestion, such as whether to maintain the current route, to the new congestion. In other words, when the driver has indicated that the current route should be maintained against the previous congestion, the current route is maintained without performing a notification of the new congestion, even when the driver encounters the new congestion. When the driver has indicated at the time of the previous congestion that the driver should reroute, the system will also provide the notification of the new congestion when the driver encounters the new congestion.

Such a configuration eliminates the need for the driver to input a response policy every time the driver encounters a congestion when the driver is caught in a plurality of congestions on a single trip. In other words, the configuration can reduce the possibility of causing annoyance to the driver.

Modification (8)

When the driver encounters a new congestion while the driver is sleeping, the processor 31 may change whether or not the response policy indicated by the driver against the previous congestion is automatically applied as the response policy for the new congestion, depending on the reason for the new congestion. The new congestion here refers to a newly encountered congestion for which the notification or an input request for response policy has not yet been performed. In other words, the new congestion is another congestion other than the congestion that has already been notified and/or left by the driver. For example, the processor 31 may perform the congestion notification in the conspicuous mode even while the flag for suspending notification is set to ON when the new congestion is caused by an accident or the like, or in other words, when the influence on the arrival time is expected to be significant.

Figure 8:
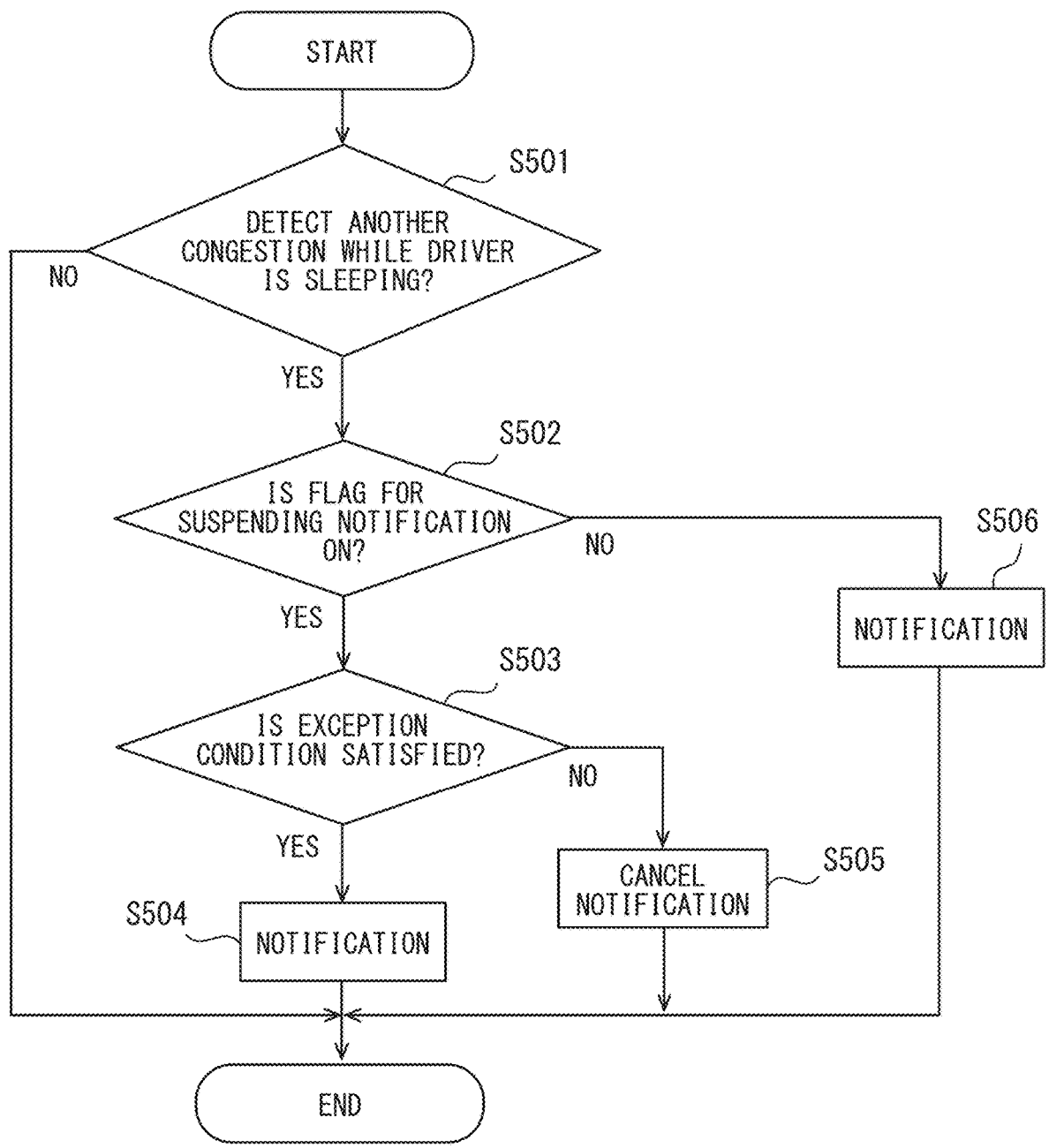
FIG. 8 is a flowchart for describing a process of switching execution/inexecution of a notification according to a reason for the congestion.

FIG. 8 is a flowchart corresponding to the technical concept. When the processor 31 detects a new congestion while the driver sleeps as shown in FIG. 8 (YES in Step S501) and the flag for suspending notification is set to ON (YES in Step S502), the processor 31 determines whether a predetermined exception condition is met. The exception condition is a condition for performing the notification on the congestion even when the flag for suspending notification is ON. The exception condition can employ, for example, that the reason for the congestion is an accident, or that the congestion length or the delay amount in arrival is equal to or greater than a predetermined value. Step S502 corresponds to a step of determining whether or not maintaining the current route against the previous congestion has been employed as the response policy.

When the new congestion satisfies the exception condition (YES in Step S503), the processor 31 performs the congestion notification in the conspicuous mode (Step S504), even when the flag for suspending notification is set to ON. In other words, even when maintaining the current route at the time of the previous congestion encounter has been employed as the response policy, the new congestion will be reported. This configuration reduces the possibility of delay for the driver to realize that the driver has unexpectedly encountered a large scale congestion. In addition, during the congestion due to the accident or the like, the traveling environment is more likely to fail to satisfy the ODD due to a reduction in the number of effective lanes, a vehicle speed restriction, or a change in weather condition over time. When the driver encounters the congestion due to the accident and the like, the driver can be awakened in advance so that a smooth switching of the drivers can take place when the need for switching of the drivers arises.

The configuration that employs that the reason for congestion is a traffic accident as an exception condition corresponds, in one aspect, to a configuration in which the response policy for the previous congestion is not applied to the new congestion when the reason for the congestion is the traffic accident. The configuration also corresponds to a configuration that automatically applies the response policy for the previous congestion to the new congestion when the reason for the congestion is not an accident, such as an excessive traffic volume.

When the response policy was input to maintain the current route at the previous congestion encounter, and the new congestion does not satisfy the exception condition, the processor 31 cancels the notification regarding the new congestion (Step S505). This configuration reduces the possibility of unnecessarily waking of the driver. When the response policy is employed to change the route at the last congestion encounter, that is, the flag for suspending notification is OFF (NO in Step S502), the processor 31 performs the congestion notification in the conspicuous mode (Step S506). With this configuration, the possibility that the system will operate in accordance with the driver's intentions can be increased.

Modification (9)

The processor 31 may be configured to determine whether or not the driver is in an unwell state based on the output signal of the occupant state sensor 16. The term unwell here refers to a state in which at least one of body or mind is not in good condition. The unwell state includes a state in which the sleepiness level is equal to or greater than a predetermined level, a physically tired state, as well as stressed state. For example, the processor 31 determines whether the driver is unwell or not based on the pulse rate, the body temperature, the amount of activity (for example, the number of steps), the eye openings, a frequency of yawning, and an elapsed time since the start of driving, within the last predetermined time. For example, the processor 31 determines that the driver is unwell based on the fact that the eye openings are equal to or less than a predetermined value and that the predetermined body motion suggestive of drowsiness, such as yawning, are observed.

When the processor 31 detects that the driver is unwell, the processor 31 may suggest that the driver take a sleep, provided that Level 4 automated driving is being performed. The sleep suggestion can be accompanied by an image display on the display 21 and the sound effect or the announcement output from the speaker 22. The processor 31 may then be configured to not perform the notification of the congestion for at least a predetermined time, even when there is a delay due to the congestion, when the driver sleeps as a result of the sleep suggestion.

Figure 9:
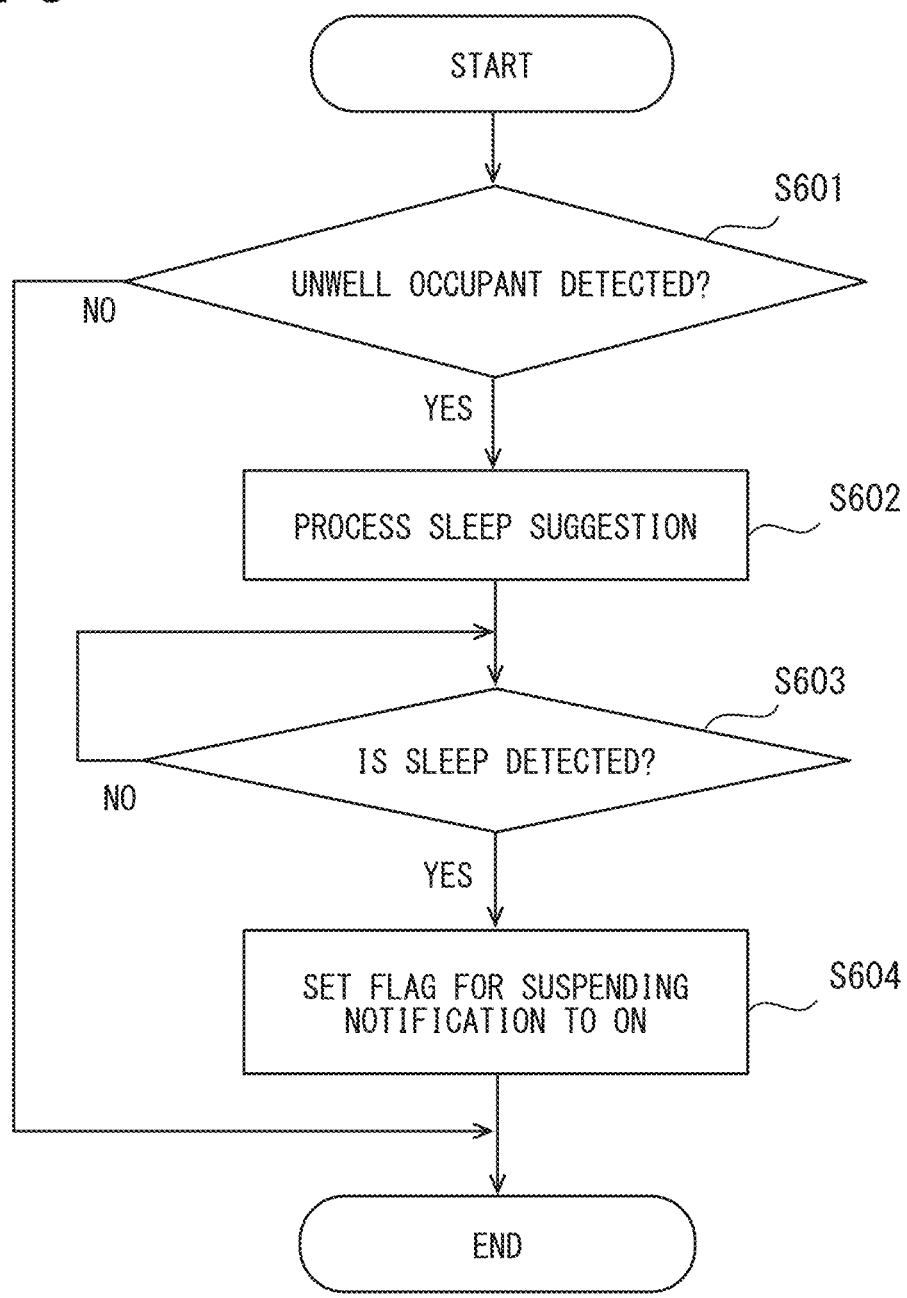
FIG. 9 is a flowchart for describing a process of switching the execution/inexecution of a notification during sleep according to a physical condition of the driver.

FIG. 9 is a flowchart showing an example of the operation of the processor 31 corresponding to the above technical concept, with Steps S601 through S604. The flowchart is executed periodically during Level 4 automated driving. Step S601 is a step of determining whether or not the driver is unwell based on the output signal of the occupant state sensor 16. When the processor 31 determines that the driver is unwell, the processor 31 displays a message recommending that the driver take a nap as a rest suggestion process (Step S602) on the display 21. As a result of a rest suggestion process, the processor 31 may automatically set the driver seat in the resting posture when an affirmative response is received from the driver by the driving operation of the input device 23 or by voice input.

When the processor 31 then detects that the driver has fallen asleep based on the signal from the occupant state sensor 16 (YES in Step S603), the processor 31 sets the flag for suspending notification to ON. When the driver is then awakened or a predetermined time has elapsed since falling asleep, the processor 31 sets the flag for suspending notification to OFF. The processor 31 is also preferred to stop the notification while the driver is asleep as well as for a predetermined time after the rest suggestion process is performed. This is because there is a concern that the congestion notification in the conspicuous mode may cause discomfort to the driver who are trying to sleep. The processor 31 may employ a discreet mode as the notification mode of the congestion and the like, for a predetermined time after the rest suggestion process is performed.

The above configuration corresponds to a configuration that prioritizes the driver's physical condition over the notification on the congestion. With this configuration, the driver can be restrained from performing the driving operation in an unwell state. The resulting effect is also expected to increase safety.

Modification (10)

The processor 31 may also change its response to the congestion depending not only on whether the driver is asleep or awake, but also on whether the passenger is asleep or awake. For example, the processor 31 may notify the congestion information when the passenger is awake and not checking outside the vehicle. When the driver and all the passengers are asleep, only the image display may be used and the sound output may be canceled.

Modification (11)

The above describes the configuration in which the notification mode of the congestion information when the driver is asleep is changed according to the sleep depth, but it is not limited thereto. The technical concept of changing the notification mode and/or the operation of the on-board HMI 20 according to the sleep depth can be applied to the notification process for other information. For example, a reporting regarding to a remaining amount of energy for driving, such as battery storage capacity or gasoline, may also be changed according to the sleep depth. For example, when the driver is awake, the system may inform when the remaining amount of energy is equal to or less than a predetermined first threshold, and when the driver is asleep, the system may hold the notification until the remaining amount of energy is equal to or less than a second threshold. The second threshold is set to a value smaller than the first threshold. The first threshold is set to a value equivalent to 15% or 20% of a full charge capacity and the like, while the second threshold is set to a value equivalent to 5% or 10% of full charge capacity and the like. When the remaining amount of energy is below the second threshold but the driver is still asleep, the notification mode for the remaining amount of energy may be performed in such a way that the more the sleep depth of the driver is, the stronger the stimulation becomes. This configuration reduces the possibility of running out of energy while the user is asleep.

Modification (12)

When encountering the congestion, the automated driving time may become longer than the originally planned time. Since the energy is consumed by driving the surrounding monitoring sensors 11 even while driving through the congestion section, an unexpected energy shortage (for example, gasoline shortage) can occur when encountering the congestion. The driver is more likely to notice a drop in the remaining amount of energy when awake, while it is difficult for the driver to recognize a drop in the remaining amount of energy during sleep.

Under such circumstances, the processor 31 may notice the drop in the remaining amount of energy in the conspicuous mode when it is foreseen during the sleep of the driver that the remaining amount of energy for driving will be less than a predetermined value due to the congestion. In such cases, the notification can include encountering the congestion, in addition to a concern about an insufficient remaining amount of energy.

Figure 10:
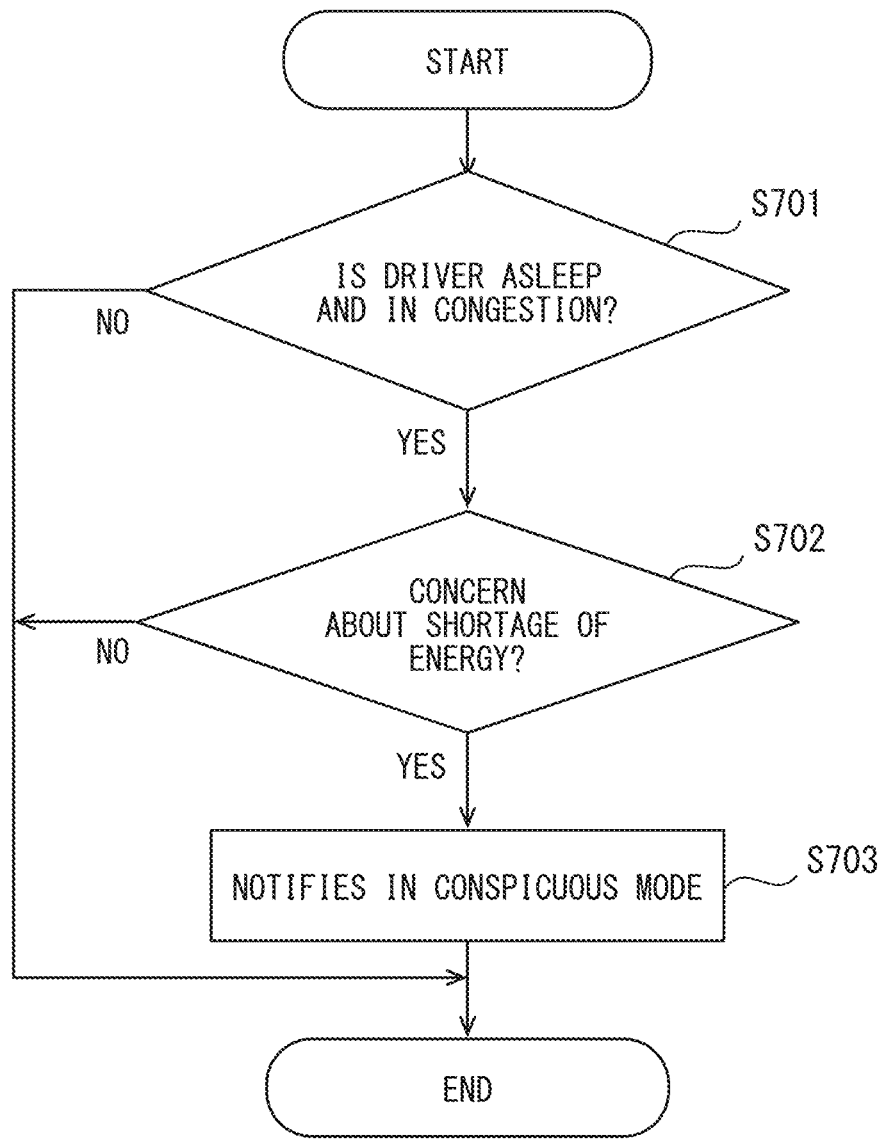

For example, the processor 31 can operate according to the procedure shown in FIG. 10. That is, when the processor 31 determines that there is a concern of energy shortage (YES in Step S702) while the driver is asleep and in the congestion (YES in Step S701), the processor 31 will notify the driver of the low remaining amount of energy in the conspicuous mode (Step S703). Whether or not the energy shortage occurs is determined based on, for example, the current remaining amount of energy, the amount of energy consumed per unit of time, and the time it takes to exit the congestion or arrive at the destination. The energy consumption per unit of time can be identified by the processor 31 by comparing a remaining amount of energy up to a certain time and the current remaining amount of energy. The time to exit the congestion can be calculated based on the congestion information received from an external source. It is sufficient that the determination of whether or not the energy shortage is likely to occur is performed at predetermined time intervals, for example, 1 minute.

According to the above configuration, when the driver is caught in the congestion while sleeping and needs to refuel or charge the battery or the like, this can be recognized immediately. Even when there was no energy shortage concern (NO in Step S702), the processor 31 may perform the congestion notification in the conspicuous mode based on the reason for the congestion satisfying a predetermined condition, such as the congestion length/the delay amount in arrival.

In addition to the energy shortage, the processor 31 may also perform the congestion notification in the conspicuous mode, without regard to the congestion length and the like, when the weather changes while the driver is asleep and in congestion, for example, when the driver encounters a guerrilla downpour. Certainly, the processor 31 may perform the congestion notification in the conspicuous mode based on the weather information distributed from the center, before detecting that the weather condition has actually changed, for example, when the processor 31 detects that rainfall of a predetermined level or more will be encountered within a predetermined time.

During the congestion, the moving speed is reduced and the vehicle may encounter precipitation that it should not have encountered at the time of the departure or the beginning of the automated driving. Depending on the amount of rainfall, it is possible that the traveling environment may no longer satisfy the ODD. The processor 31 may notify the current status in the conspicuous mode when the environmental factor that was not foreseen at the start of the automated driving causes the scheduled ODD exit time to be earlier by a predetermined value or more, or when the environmental factor that may cause the scheduled ODD exit time to be earlier is detected. The content of the notification preferably includes the fact that the vehicle is in congestion and that the end of the automated driving may become earlier. With the configuration, the possibility of the driver being awake at a point in time when actually exiting the ODD can be increased, and as a result, the switching of the drivers can be performed more smoothly. The scheduled exit time of the ODD corresponds to the time when a handover request is performed and the automated driving is terminated. Environmental elements that can accelerate the scheduled ODD exit time are those that can terminate the automated driving, such as rainfall equal to or greater than a predetermined amount, snowfall, dense fog, or icy road surfaces. An event subject to the notification corresponds to the fact that the remaining amount of energy has fallen equal to or less than a predetermined value or the occurrence of an environmental element that could terminate the automated driving.

Modification (13)

Figure 11:
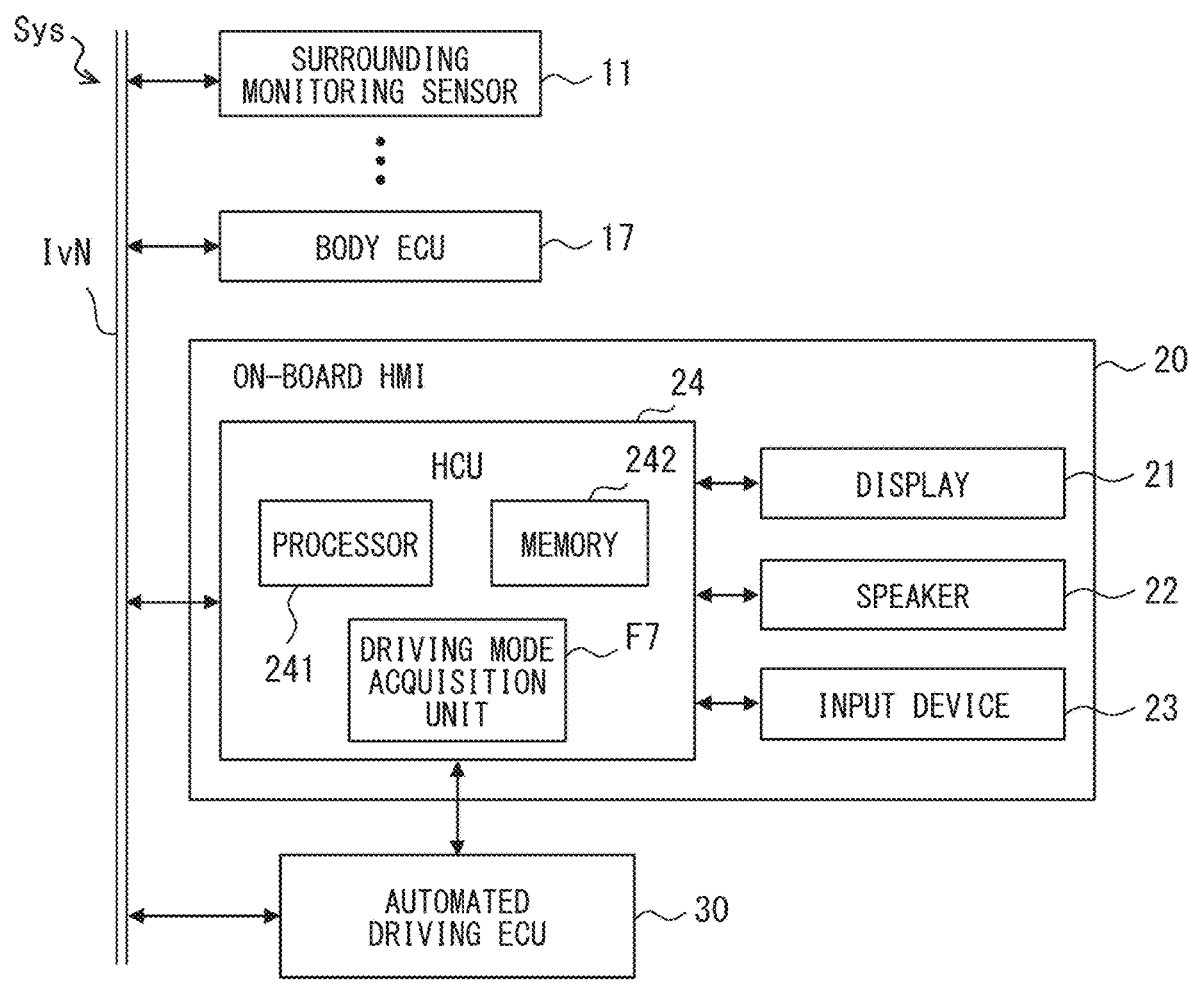
FIG. 11 is a block diagram showing another configuration example of the automated driving system.

The automated driving system Sys may include an HCU 24 that provides overall control of notification devices such as display 21, as shown in FIG. 11. In FIG. 11, some of the configurations shown in FIGS. 1 and 2 are omitted. The HCU 24 is realized using a processor 241 and a memory 242.

The functions regarding a congestion notification control may be provided by the HCU 24. In other words, the HCU 24 includes a driving mode acquisition unit F7 in addition to the aforementioned functional units for the congestion notification control, such as the information acquisition unit F1, the congestion recognition unit F21, the occupant state acquisition unit F3, and the notification processing unit F61. The driving mode acquisition unit F7 is configured to acquire the current operating mode from the automated driving ECU 30. The driving mode acquisition unit F7 acquires a signal from the automated driving ECU 30 indicating whether or not the automated driving equivalent to automation Level 4 or 5 is being executed.

In the above configuration, the HCU 24, similarly to the automated driving ECU 30 described above, changes the mode of the congestion notification that the subject vehicle is/will be encountering based on at least one of whether the driver is asleep or not and the congestion length while the automated driving is being executed. The HCU 24 can also control the notification regarding the drop in the remaining amount of energy while the driver is asleep, the remaining ODD exit time, and the like. The configuration that includes a functional unit that adjusts the notification mode of the congestion information in the HCU24 or the automated driving ECU30 corresponds to the notification control device. In addition, the method they execute corresponds to the notification control method.

ADDITIONAL REMARK

The devices, systems, and methods thereof described in this disclosure may be realized by a dedicated computer including a processor programmed to execute one or more functions embodied by a computer program. The devices and methods thereof described in this disclosure may also be realized using dedicated hardware logic circuits. Furthermore, the apparatuses and methods thereof described in the present disclosure may be realized by one or more dedicated computers, each of which is composed of a processor executing a computer program in combination with one or more hardware logic circuits. For example, some or all of the functions provided by the processor 31 may be realized as hardware. A hardware realization of a certain function includes the use of one or more ICs. CPUs, MPUs, GPUs, Data Flow Processors (DFPs), and the like can be employed as processors (arithmetic cores). Some or all of the functions provided by processor 31 may be realized by combining a plurality of types of arithmetic processors. Some or all of the functions provided by the processor 31 may be realized using a System-on-Chip (SoC), FPGA, or ASIC. FPGA stands for Field-Programmable Gate Array. ASIC stands for Application Specific Integrated Circuit. The same is true for the processor 241.

The computer program may also be stored as instructions to be executed by a computer on a computer-readable non-transitory tangible storage medium. Hard disk drives (HDD), solid state drives (SSD), flash memory, and the like can be employed as storage media for the program.

In addition to the processor 31 described above, various other forms, such as a system including the processor 31, are also included in the scope of this disclosure. For example, a program for causing a computer to function as the automated driving ECU 30 and/or the HCU 24 and a non-transitory actual recording medium such as a semiconductor memory in which the program is recorded are also included in the scope of this disclosure.

What is claimed is:

1. An automated operation device configured to perform automated driving at an automation level that allows a driver-seat occupant, who is an occupant seated on a driver seat to sleep, the automated operation device comprising:

a congestion information acquisition unit configured to acquire information on congestion on a travel route of a subject vehicle;

a congestion notification processing unit configured to execute processing to cause a notification device to notify the driver-seat occupant of the information on the congestion; and an occupant state acquisition unit configured to acquire whether the driver-seat occupant is asleep based on an input signal from an occupant state sensor that is configured to sense a state of the driver-seat occupant, wherein the congestion notification processing unit is configured to change a notification mode of the congestion based on whether the driver-seat occupant is asleep, while the automated driving is performed.

2. The automated operation device according to claim 1, wherein,
the occupant state acquisition unit is configured to determine, as a depth of the sleep when the driver-seat occupant is asleep, a sleep depth, and
the congestion notification processing unit is configured to change whether to provide the notification of the congestion based on the sleep depth, while the automated driving is performed.

3. The automated operation device according to claim 2, wherein
the congestion notification processing unit is configured, while the automated driving is performed,
to provide the notification of the congestion, when the sleep depth is less than a predetermined reference value, and
not to provide the notification of the congestion, when the sleep depth is equal to or greater than the reference value.

4. The automated operation device according to claim 2, wherein
the congestion information acquisition unit is configured to acquire a delay amount in arrival, which is an amount of delay in estimated arrival time due to the congestion, or a congestion length indicating a length of the congestion, and
the congestion notification processing unit is configured to change the notification mode of the congestion based on the delay amount in arrival or the congestion length and whether the driver-seat occupant is asleep, while the automated driving is performed.

5. The automated operation device according to claim 4, wherein
the congestion notification processing unit is configured to
acquire an allowable threshold, which indicates a delay time caused by the congestion and allowed by the driver-seat occupant, based on a signal from an input device or pre-registered data, and
the congestion notification processing unit is configured to, while the automated driving is performed, and while the driver-seat occupant is asleep,
cancel the notification of the congestion, when the delay amount in arrival or the congestion length is less than the allowable threshold, and
perform the notification of the congestion, when the delay amount in arrival or the congestion length is equal to or greater than the allowable threshold.

6. The automated operation device according to claim 1, wherein,
the occupant state acquisition unit is configured to determine whether a passenger is awake, based on a signal from a passenger sensor that is configured to detect a state of the passenger, and
the congestion notification processing unit is configured to cause a display, which is the notification device, to display detailed information on the congestion, when the passenger is awake, and when the driver-seat occupant is asleep.

7. The automated operation device according to claim 1, wherein
the congestion notification processing unit is configured to:

acquire setting information on whether the driver-seat occupant allows a delay due to a congestion, based on a signal from an input device or pre-registered data, and
suspend the notification of the congestion, while the automated driving is performed, when the setting information as acquired indicates that the driver-seat occupant allows the delay due to the congestion.

8. The automated operation device according to claim 1, wherein
the congestion information acquisition unit is configured to acquire a cause of the congestion, and
the congestion notification processing unit is configured to change a timing of the notification of the congestion or an intensity of a stimulation to the driver-seat occupant at a time of notification, based on whether the cause of the congestion is an accident.

9. The automated operation device according to claim 1, wherein
the congestion notification processing unit is configured, when the automated driving is not being executed,
to perform the notification of the congestion in a predetermined mode, or
not to perform a notification that does not include detailed information on the congestion.

10. The automated operation device according to claim 1, wherein
the notification of the congestion includes requesting a driver to select whether to reroute, and
the congestion notification processing unit is configured, when the driver selects not to reroute in response to the congestion notification,
not to perform the notification of the congestion, even when encountering an other congestion than the notified congestion.

11. The automated operation device according to claim 10, wherein,
the congestion information acquisition unit is configured to acquire whether a cause of the congestion is a traffic accident, and
the congestion notification processing unit is configured, when the cause of the other congestion is a traffic accident,
to perform the notification of the congestion, even when the driver selects, as a response policy to the previous congestion, not to reroute.

12. The automated operation device according to claim 1, wherein,
the notification of the congestion includes requesting a driver to select, as a response policy to the congestion, whether to reroute, and
the congestion notification processing unit is configured, when encountering an other congestion than the congestion which has been already left,
to automatically change whether to apply the response policy instructed by the driver to the congestion, which has been already left, as the response policy to the other congestion, based on whether a reason of the congestion is a traffic accident.

13. The automated operation device according to claim 1, wherein
the occupant state acquisition unit is configured to acquire a sleep duration, which is a time that the driver-seat occupant is asleep, and
the congestion notification processing unit is configured to acquire, as a sleep time desired by the driver-seat occupant, a desired sleep time, based on a signal from an input device or pre-registered data, and not to perform the notification of the congestion, when the sleep duration is less than the desired sleep time, even when the driver-seat occupant encounters the congestion while sleeping.

14. The automated operation device according to claim 1 including at least one processor and a memory, the memory storing instructions configured to, when executed by the at least one processor, cause the at least one processor to execute processing, as the congestion information acquisition unit, the congestion notification processing unit, and the occupant state acquisition unit, determine whether a physical condition of the driver-seat occupant is well, based on an input signal from the occupant state sensor, propose to sleep, when the physical condition of the driver-seat occupant is determined to be unwell, on condition that the automated driving is performed, and not to perform the notification of the congestion, when the driver-seat occupant has shifted to a sleep state after the proposing, for a predetermined time after the driver-seat occupant falls asleep.

15. The automated operation device according to claim 1 including at least one processor and a memory, the memory storing instructions configured to, when executed by the at least one processor, cause the at least one processor to execute processing as the congestion information acquisition unit, the congestion notification processing unit, and the occupant state acquisition unit; and execute processing to awake the driver-seat occupant when an event subject to notification occurs as a result of an encounter of the congestion, while the driver-seat occupant is asleep, the event subject to notification being not anticipated at a start of the automated driving, wherein the event subject to notification includes a decrease in amount of energy remaining for the subject vehicle to travel, or an occurrence of an environmental element that possibly terminates the automated driving.

16. The automated operation device according to claim 1 including at least one processor and a memory, the memory storing instructions configured to, when executed by the at least one processor, cause the at least one processor to execute processing as the congestion information acquisition unit, the congestion notification processing unit, and the occupant state acquisition unit, acquire a remaining amount of energy from a sensor that detects the remaining amount of energy for the subject vehicle to travel, determine whether the energy is possibly to be insufficient due to the congestion, when the congestion is encountered while the driver-seat occupant is asleep, and awake the driver-seat occupant when the energy is possibly to be insufficient.

17. An automated operation device configured to perform automated driving at an automation level that allows a driver-seat occupant to sleep, the automated operation device comprising:

a congestion information acquisition unit configured to acquire information on congestion on a travel route of a subject vehicle; and a congestion notification processing unit configured to execute processing to cause a notification device to notify the driver-seat occupant of the information on the congestion, wherein the congestion information acquisition unit is configured to acquire a delay amount in arrival, which is an amount of delay in estimated arrival time due to the congestion, or a congestion length indicating a length of congestion, and the congestion notification processing unit is configured to change a notification mode of the congestion, according to the delay amount in arrival or the congestion length, while the automated driving is performed.

18. The automated operation device according to claim 17, wherein, the congestion notification processing unit is configured, while the automated driving is performed, to perform the notification of the congestion, when the delay amount in arrival or the congestion length is equal to or greater than a predetermined allowable threshold, and not to perform the notification of the congestion, when the delay amount in arrival or the congestion length is less than the allowable threshold.

19. A notification control device to be used in connection with an automated operation device, the automated operation device configured to perform automated driving at an automation level that allows a driver-seat occupant, who is an occupant seated on a driver seat to sleep, the notification control device comprising:

a congestion information acquisition unit configured to acquire information on congestion on a travel route of a subject vehicle;

a congestion notification processing unit configured to execute processing to cause a notification device to notify the driver-seat occupant of the information on the congestion;

an occupant state acquisition unit configured to acquire a sleep state of the driver-seat occupant based on an input signal from an occupant state sensor that is configured to sense a state of the driver-seat occupant; and an driving mode acquisition unit configured to acquire a signal indicating whether the automated driving is performed from the automated operation device, wherein the congestion notification processing unit is configured to change a notification mode of the congestion, based on whether the driver-seat occupant is asleep while the automated driving is performed.

20. A notification control method to be performed by at least one processor for a vehicle, the notification control method comprising:

acquiring information on congestion on a travel route of the vehicle based on data received from an external device or a result detected by a peripheral monitoring sensor mounted on the vehicle;

executing processing to cause a notification device to notify a driver-seat occupant, who is an occupant seated on a driver seat, of the information on the congestion;

acquiring occupant state information including whether the driver-seat occupant is asleep, based on an input signal from an occupant state sensor that is configured to sense a state of the driver-seat occupant;

acquiring a signal indicating whether the automated driving is performed from an automated operation device, the automated operation device configured to perform the automated driving at an automation level that allows the driver-seat occupant to sleep; and changing a notification mode of the congestion based on whether the driver-seat occupant is asleep while the automated driving is performed.

\* \* \* \* \*